US012602047B2

(12) United States Patent
Takao

(10) Patent No.: US 12,602,047 B2
(45) Date of Patent: Apr. 14, 2026

(54) CONTROL METHOD FOR MOBILE OBJECT, MOBILE OBJECT, AND COMPUTER-READABLE STORAGE MEDIUM

(71) Applicant: Mitsubishi Logisnext Co., Ltd., Nagaokakyo (JP)

(72) Inventor: Kenji Takao, Tokyo (JP)

(73) Assignee: MITSUBISHI LOGISNEXT CO., LTD., Nagaokakyo (JP)

( * ) Notice: Subject to any disclaimer, the term of this patent is extended or adjusted under 35 U.S.C. 154(b) by 304 days.

(21) Appl. No.: 17/955,994

(22) Filed: Sep. 29, 2022

(65) Prior Publication Data

US 2023/0205213 A1 Jun. 29, 2023

(30) Foreign Application Priority Data

Dec. 28, 2021 (JP) ................................. 2021-214920

(51) Int. Cl.
| | |
|---|---|
| *G05D 1/02* | (2020.01) |
| *B66F 9/06* | (2006.01) |
| *G05D 1/00* | (2006.01) |
| *G06T 7/70* | (2017.01) |

(52) U.S. Cl.
CPC ........... *G05D 1/0214* (2013.01); *B66F 9/063* (2013.01); *G05D 1/024* (2013.01); *G06T 7/70* (2017.01); *G06T 2207/30252* (2013.01)

(58) Field of Classification Search
CPC ........ G05D 1/0214; G05D 1/024; G06T 7/70; G06T 2207/30252; B66F 9/063
USPC .......................................................... 701/23
See application file for complete search history.

(56) References Cited

U.S. PATENT DOCUMENTS

| | | | |
|---|---|---|---|
| 11,427,449 B2 | 8/2022 | Hasegawa et al. | |
| 11,604,281 B2 | 3/2023 | Hattori | |
| 12,085,937 B2 | 9/2024 | Takao | |
| 2016/0297655 A1* | 10/2016 | Weiss .................... | B62B 3/0618 |
| 2018/0120465 A1 | 5/2018 | Rose et al. | |
| 2020/0002143 A1* | 1/2020 | Hasegawa ............ | G05D 1/0246 |
| 2020/0377350 A1* | 12/2020 | Nonogaki .............. | B66F 9/148 |

(Continued)

FOREIGN PATENT DOCUMENTS

| | | |
|---|---|---|
| CN | 107473139 A | 12/2017 |
| CN | 110054116 A | 7/2019 |

(Continued)

OTHER PUBLICATIONS

Japanese Office Action for Japanese Application No. 2021-214920, dated Mar. 5, 2024, with English translation.

(Continued)

*Primary Examiner* — Adam D Tissot
(74) *Attorney, Agent, or Firm* — Birch, Stewart, Kolasch & Birch, LLP

(57) ABSTRACT

A control method for a mobile object is a control method for a mobile object that automatically moves. The control method includes detecting a position of a target object to be conveyed with respect to the mobile object, and acquiring, based on a detection result of the position of the target object, positional information on the target object indicating the position of the target object with respect to the mobile object in a state in which a fork disposed on the mobile object is inserted into a hole formed on the target object.

8 Claims, 15 Drawing Sheets

(56) References Cited

U.S. PATENT DOCUMENTS

| | | |
|---|---|---|
| 2021/0041564 A1 | 2/2021 | Hattori |
| 2021/0271246 A1 | 9/2021 | Takao |

FOREIGN PATENT DOCUMENTS

| | | |
|---|---|---|
| CN | 110727268 A | 1/2020 |
| CN | 113387302 A | 9/2021 |
| CN | 113511611 A | 10/2021 |
| JP | 61-174099 A | 8/1986 |
| JP | 3-211199 A | 9/1991 |
| JP | 5-186200 A | 7/1993 |
| JP | 11-278799 A | 10/1999 |
| JP | 2020-1906 A | 1/2020 |
| JP | 2020-193061 A | 12/2020 |
| JP | 2021-24728 A | 2/2021 |
| JP | 2021-149177 A | 9/2021 |

OTHER PUBLICATIONS

Extended European Search Report for European Application No. 22198978.3, dated May 23, 2023.
Chinese Office Action and Search Report for Chinese Application No. 202211197657.2, dated Jul. 9, 2025, with English translation.

\* cited by examiner

FIG.7

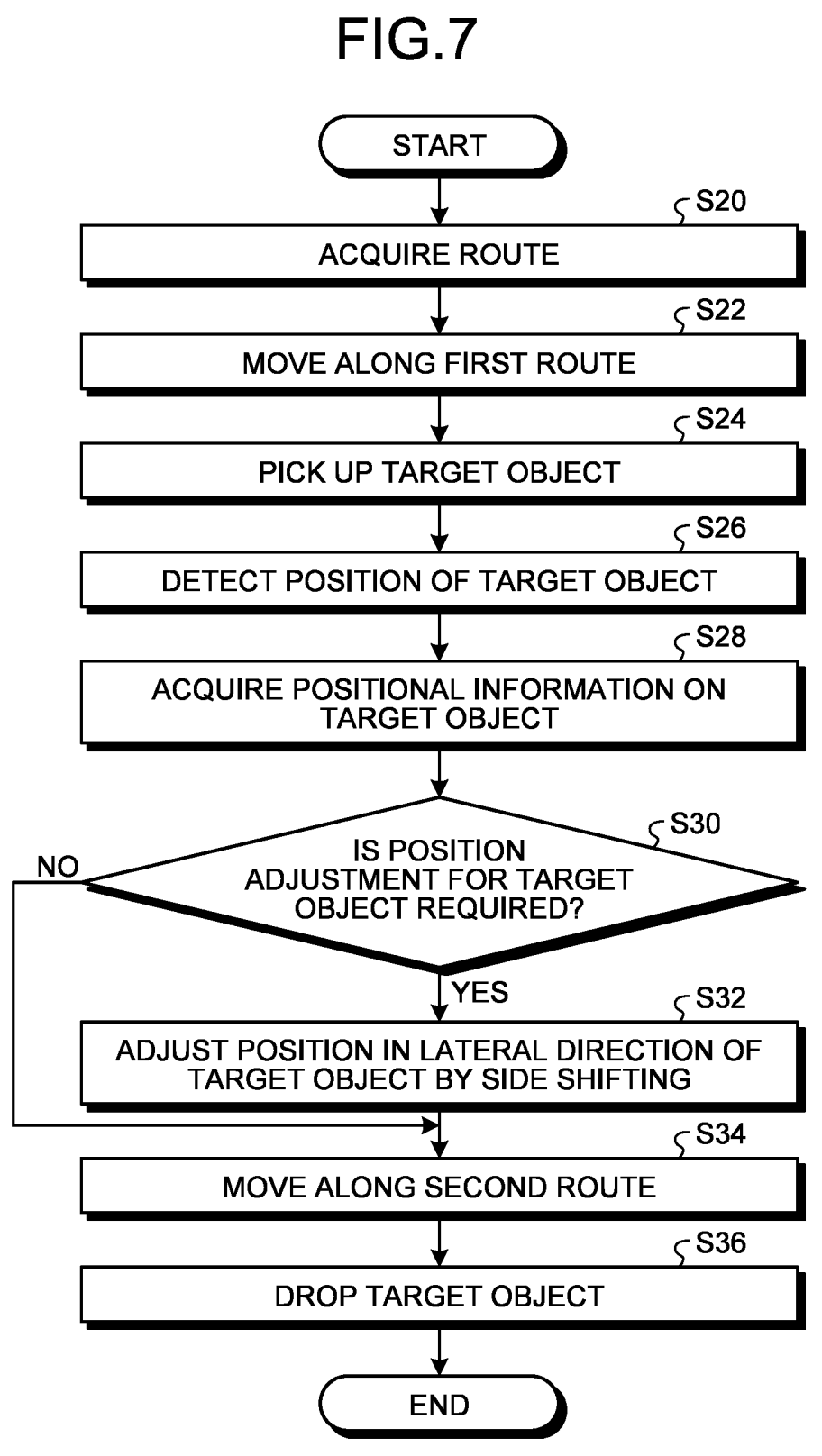

START

S20
ACQUIRE ROUTE

S22
MOVE ALONG FIRST ROUTE

S24
PICK UP TARGET OBJECT

S26
DETECT POSITION OF TARGET OBJECT

S28
ACQUIRE POSITIONAL INFORMATION ON TARGET OBJECT

S30
IS POSITION ADJUSTMENT FOR TARGET OBJECT REQUIRED?

NO

YES

S32
ADJUST POSITION IN LATERAL DIRECTION OF TARGET OBJECT BY SIDE SHIFTING

S34
MOVE ALONG SECOND ROUTE

S36
DROP TARGET OBJECT

END

FIG.8

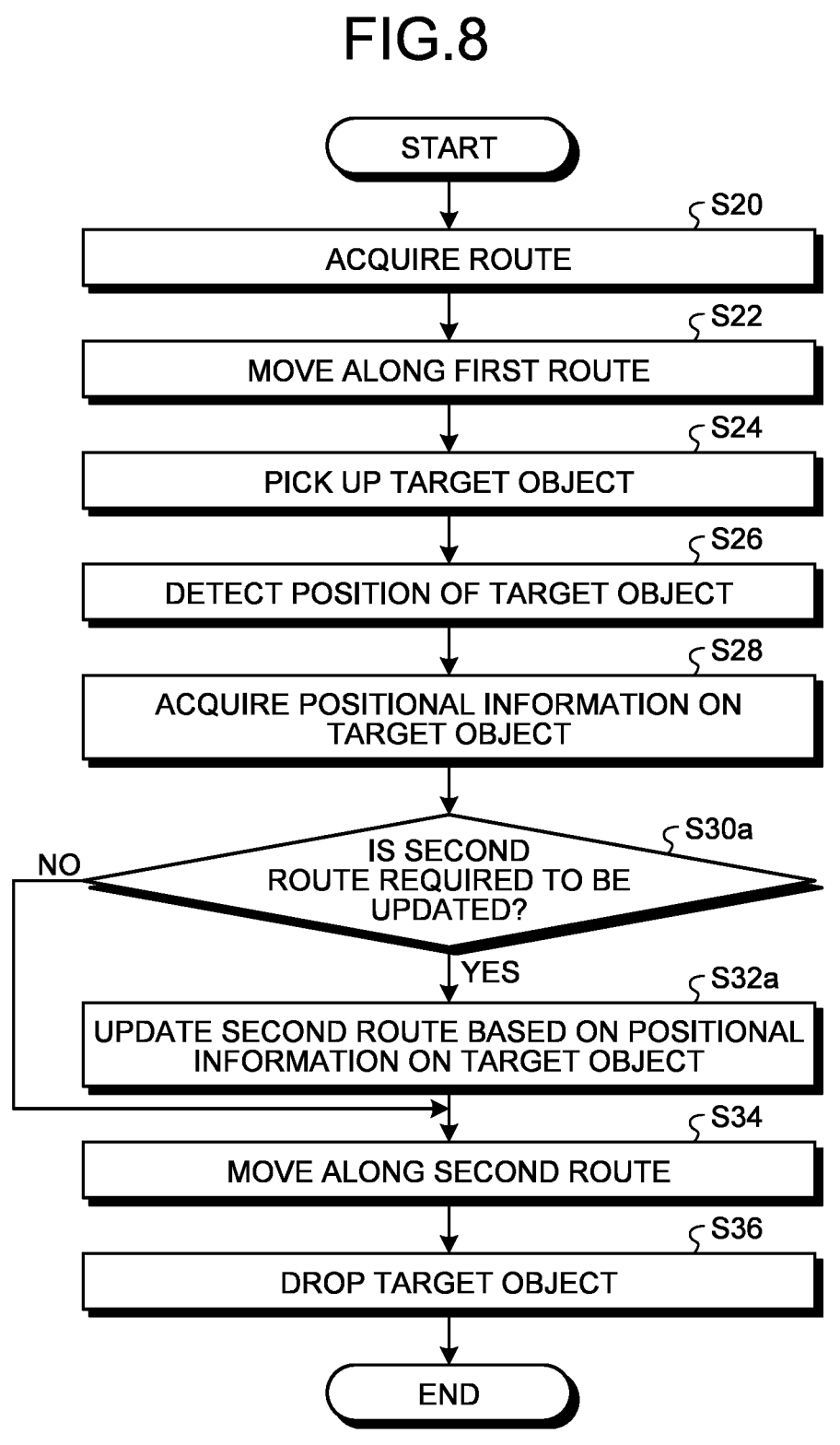

START

S20
ACQUIRE ROUTE

S22
MOVE ALONG FIRST ROUTE

S24
PICK UP TARGET OBJECT

S26
DETECT POSITION OF TARGET OBJECT

S28
ACQUIRE POSITIONAL INFORMATION ON TARGET OBJECT

S30a
IS SECOND ROUTE REQUIRED TO BE UPDATED?

NO

YES

S32a
UPDATE SECOND ROUTE BASED ON POSITIONAL INFORMATION ON TARGET OBJECT

S34
MOVE ALONG SECOND ROUTE

S36
DROP TARGET OBJECT

END

FIG.14

CONTROL METHOD FOR MOBILE OBJECT, MOBILE OBJECT, AND COMPUTER-READABLE STORAGE MEDIUM

CROSS-REFERENCE TO RELATED APPLICATIONS

The present application claims priority to and incorporates by reference the entire contents of Japanese Patent Application No. 2021-214920 filed in Japan on Dec. 28, 2021.

FIELD

The present disclosure relates to a control method for a mobile object, a mobile object, and a computer-readable storage medium.

BACKGROUND

For example, there is known a technique of causing a mobile object such as a forklift to automatically move. For example, Patent Literature 1 discloses a technique of guiding an unmanned forklift to face a palette by detecting the palette by a near-infrared camera disposed on the unmanned forklift.

CITATION LIST

Patent Literature

Patent Literature 1: Japanese Patent Application Laid-open No. H11-278799

SUMMARY

Technical Problem

However, even if a mobile object is guided to face a target object such as a palette, there is the possibility that misalignment of the target object with respect to the mobile object remains, and the target object cannot be appropriately conveyed.

The present disclosure is intended to solve the problem described above, and an object of the present disclosure is to provide a control method for a mobile object, a mobile object, and a computer-readable storage medium that can appropriately convey the target object.

Solution to Problem

To solve the above problem and achieve the object, a control method according to the present disclosure is for a mobile object that automatically moves. The control method includes: detecting a position of a target object to be conveyed with respect to the mobile object; and acquiring, based on a detection result of the position of the target object, positional information on the target object indicating the position of the target object with respect to the mobile object in a state in which a fork disposed on the mobile object is inserted into a hole formed on the target object.

To solve the above problem and achieve the object, a mobile object according to the present disclosure automatically moves, and includes: a detection control unit configured to cause a position of a target object to be conveyed with respect to the mobile object to be detected; and a positional information acquisition unit configured to acquire positional information on the target object indicating the position of the target object with respect to the mobile object in a state in which a fork disposed on the mobile object is inserted into a hole formed on the target object based on a detection result of the position of the target object.

To solve the above problem and achieve the object, a non-transitory computer-readable storage medium according to the present disclosure stores a computer program for causing a computer to perform a control method for a mobile object that automatically moves. The computer program includes: detecting a position of a target object to be conveyed with respect to the mobile object; and acquiring, based on a detection result of the position of the target object, positional information on the target object indicating the position of the target object with respect to the mobile object in a state in which a fork disposed on the mobile object is inserted into a hole formed on the target object.

Advantageous Effects of Invention

According to the present disclosure, the target object can be appropriately conveyed.

BRIEF DESCRIPTION OF DRAWINGS

FIG. 7 is a flowchart for explaining a processing flow for the control device according to the first embodiment.

FIG. 8 is a flowchart for explaining a processing flow for the control device according to another example of the first embodiment.

FIG. 14 is a schematic diagram for explaining an example of picking up the target object.

DESCRIPTION OF EMBODIMENTS

The following describes preferred embodiments of the present disclosure in detail with reference to the attached drawings. The present disclosure is not limited to the embodiments. In a case in which there are a plurality of embodiments, the present disclosure encompasses a combination of the embodiments.

First Embodiment

Movement Control System

Figure 1:
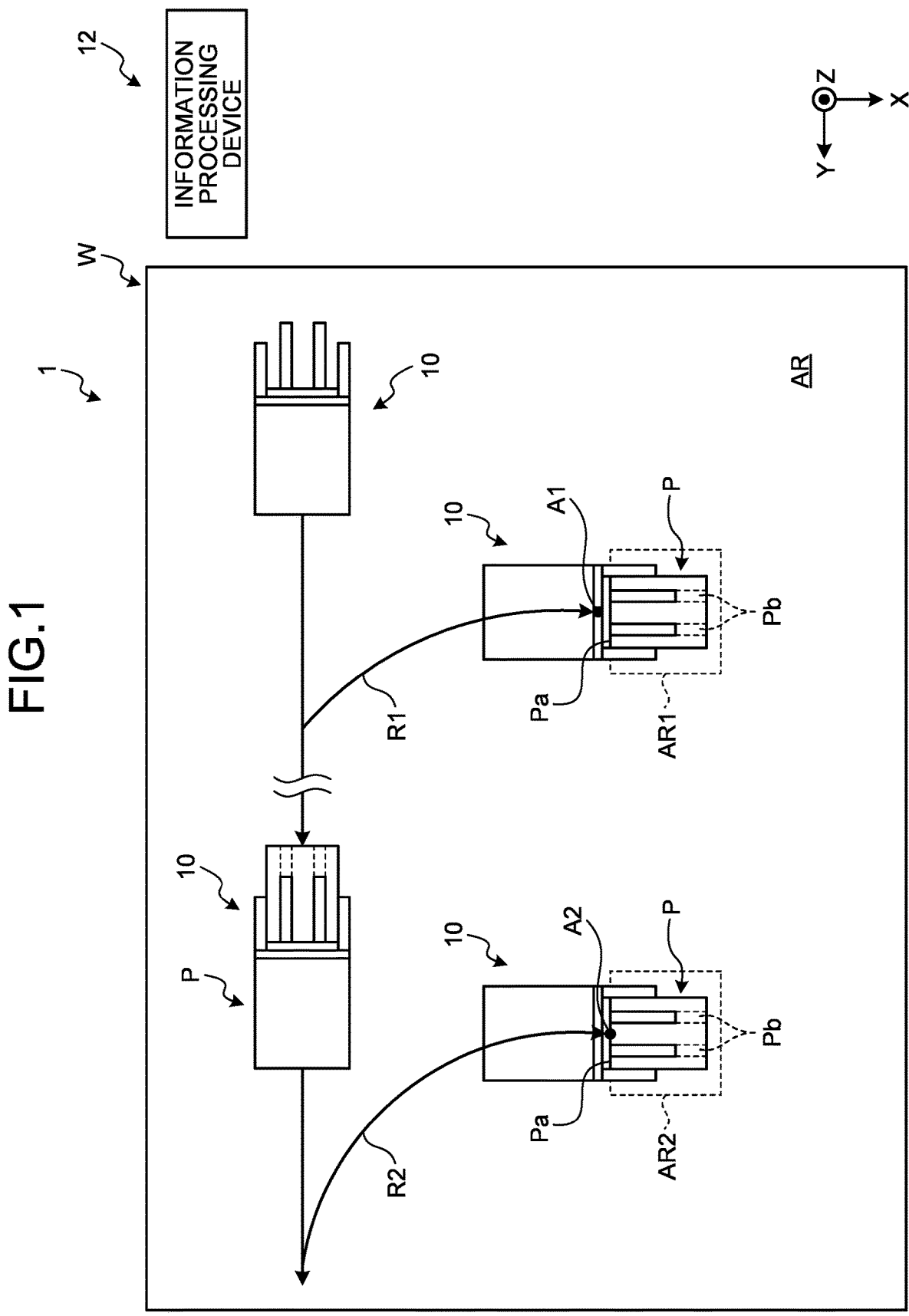
FIG. 1 is a schematic diagram of a movement control system according to a first embodiment.

FIG. 1 is a schematic diagram of a movement control system according to a first embodiment. As illustrated in FIG. 1, a movement control system 1 according to the first embodiment includes a mobile object 10 and an information processing device 12. The movement control system 1 is a system that controls movement of the mobile object 10 belonging to a facility W. The facility W is, for example, a facility such as a warehouse in which physical distribution is managed. In the movement control system 1, the mobile object 10 moves along a first route R1 to a disposition region AR1 within a region AR of the facility W, and loads (picks up) a target object P disposed in the disposition region AR1. The mobile object 10 then moves to a conveyance region AR2 along a second route R2 while loading the target object P thereon, and unloads (drops) the target object P in the conveyance region AR2. The region AR is, for example, a floor face of the facility W, which is a region in which the target object P is disposed and the mobile object 10 moves. In the present embodiment, the target object P is an object to be conveyed in which a load is mounted on a palette. A hole Pb is formed on a front surface Pa of the target object P, the hole Pb into which a fork 24 (described later) of the mobile object 10 is inserted. However, the target object P may have an optional form instead of the palette on which the load is mounted. For example, the target object P may be the load alone without the palette. The first route R1 and the second route R2 will be described later.

Hereinafter, a direction along the region AR is assumed to be an X-direction, and a direction along the region AR and intersecting with the direction X is assumed to be a Y-direction. In the present embodiment, the Y-direction is a direction orthogonal to the X-direction. Each of the X-direction and the Y-direction may also be referred to as a direction along a horizontal plane. A direction orthogonal to the X-direction and the Y-direction, more specifically, a direction toward an upper side of a vertical direction is assumed to be a Z-direction. In the present embodiment, a "position" means a position (coordinates) in a coordinate system on a two-dimensional surface on the region AR (coordinate system of the region AR) unless otherwise specified. An "attitude" of the mobile object 10 and the like is orientation of the mobile object 10 and the like in the coordinate system of the region AR unless otherwise specified, and means a yaw angle (rotation angle) of the mobile object 10 assuming that the X-direction is 0°, when viewed from the Z-direction.

Disposition Region and Conveyance Region

A plurality of the disposition regions AR1 are arranged in the region AR within the facility W. Each of the disposition regions AR1 is a region in which the target object P is disposed, that is, a region as a conveyance source. The disposition region AR1 is set in advance as a region in which the target object P is disposed. The disposition region AR1 is partitioned by a white line and the like, for example, and a position (coordinates), a shape, and a size of the disposition region AR1 are set in advance. Similarly, a plurality of the conveyance regions AR2 are arranged in the region AR within the facility W. Each of the conveyance regions AR2 is a region in which the target object P should be disposed, that is, a region as a conveyance destination. The conveyance region AR2 is set in advance as a region in which the target object P should be disposed. The conveyance region AR2 is partitioned by a white line and the like, for example, and a position (coordinates), a shape, and a size of the conveyance region AR2 are set in advance. In the present embodiment, the disposition region AR1 and the conveyance region AR2 are arranged in the region AR that is a floor of the facility W, but the embodiment is not limited thereto. For example, the disposition region AR1 and the conveyance region AR2 may be arranged in a load-carrying platform of a vehicle that has carried the target object P into the facility W, or may be arranged on a shelf and the like of the facility W. In the present embodiment, the disposition region AR1 and the conveyance region AR2 are partitioned for each target object P, and one target object P is disposed in each of the disposition region AR1 and the conveyance region AR2. However, the embodiment is not limited thereto. For example, at least one of the disposition region AR1 and the conveyance region AR2 may be set as a free space in which a plurality of the target objects P are disposed. In the example of FIG. 1, each of the disposition region AR1 and the conveyance region AR2 has a rectangular shape, but the shape and the size thereof may be optional. The number of the disposition regions AR1 and the conveyance regions AR2 arranged in the region AR may also be optional.

Mobile Object

Figure 2:
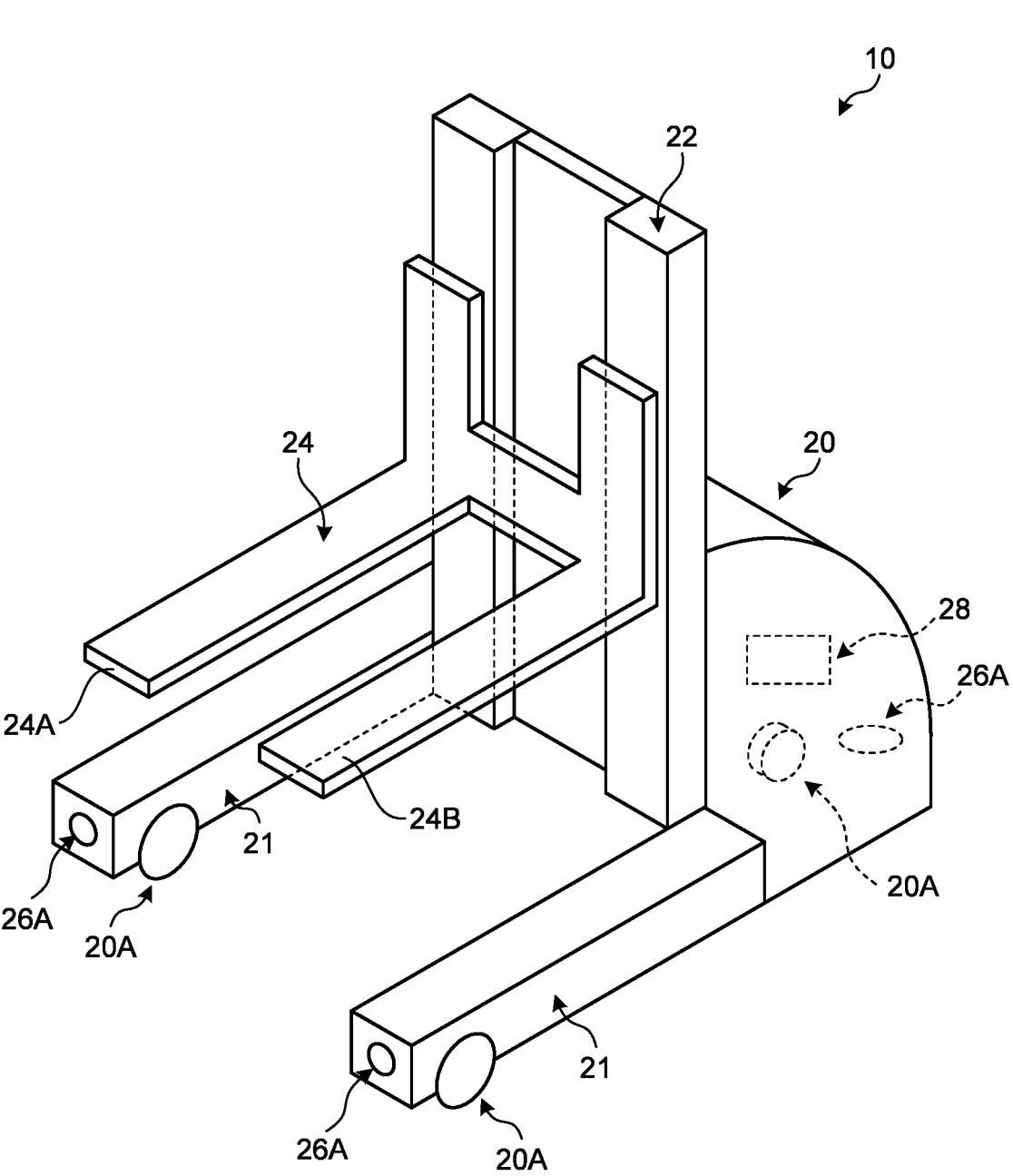
FIG. 2 is a schematic diagram of a configuration of a mobile object.

FIG. 2 is a schematic diagram of a configuration of the mobile object. The mobile object 10 is a device that can automatically move, and can convey the target object P. In more detail, in the present embodiment, the mobile object 10 is a forklift, more specifically, what is called an Automated Guided Vehicle (AGV) or an Automated Guided Forklift (AGF). As illustrated in FIG. 2, the mobile object 10 includes a vehicle body 20, wheels 20A, straddle legs 21, a mast 22, the fork 24, sensors 26A, and a control device 28. The straddle legs 21 are a pair of axial members projecting from the vehicle body 20 disposed on one end part in a front and rear direction of the vehicle body 20. The wheels 20A are disposed on distal ends of the respective straddle legs 21 and the vehicle body 20. That is, the three wheels 20A are disposed in total, but positions and the number of the wheels 20A may be optional. The mast 22 is attached to the straddle leg 21 in a movable manner, and moves in the front and rear direction of the vehicle body 20. The mast 22 extends along an upper and lower direction (the direction Z herein) orthogonal to the front and rear direction. The fork 24 is attached to the mast 22 in a manner movable in the direction Z. The fork 24 may also be movable in a lateral direction (a direction intersecting with the upper and lower direction and the front and rear direction) of the vehicle body 20 with respect to the mast 22. The fork 24 includes a pair of hooks 24A and 24B. The hooks 24A and 24B extend toward a front direction of the vehicle body 20 from the mast 22. The hook 24A and the hook 24B are disposed to be separated from each other in a lateral direction of the mast 22. Hereinafter, regarding the front and rear direction, a direction toward a side on which the fork 24 is arranged in the mobile object 10 is assumed to be a front direction, and a direction toward a side on which the fork 24 is not arranged is assumed to be a rear direction.

Each of the sensors 26A detects at least one of a position and an attitude of an object that is present around the vehicle body 20. It can also be said that the sensor 26A detects at least one of the position of the object with respect to the mobile object 10 and the attitude of the object with respect to the mobile object 10. In the present embodiment, the sensors 26A are disposed on distal ends in the front direction of the respective straddle legs 21 and on a rear direction side of the vehicle body 20. However, the positions at which the sensors 26A are disposed are not limited thereto. The sensors 26A may be disposed at optional positions, and the number of the sensors 26A to be disposed may also be optional. For example, a safety sensor installed on the mobile object 10 may be the sensor 26A.

The sensor 26A is, for example, a sensor that emits laser light. The sensor 26A emits laser light while performing scanning in one direction (herein, a lateral direction), and detects the position and orientation of the object from reflected light of the emitted laser light. That is, the sensor 26A can be assumed to be what is called a two-dimensional (2D)-Light Detection And Ranging (LiDAR). However, the sensor 26A is not limited thereto, and may be a sensor that detects the object using an optional method. For example, the sensor 26A may be what is called a three-dimensional (3D)-LiDAR that scans in a plurality of directions, or may be what is called a one-dimensional (1D)-LiDAR that does not scan.

The control device 28 controls movement of the mobile object 10. The control device 28 will be described later.

Information Processing Device

Figure 3:
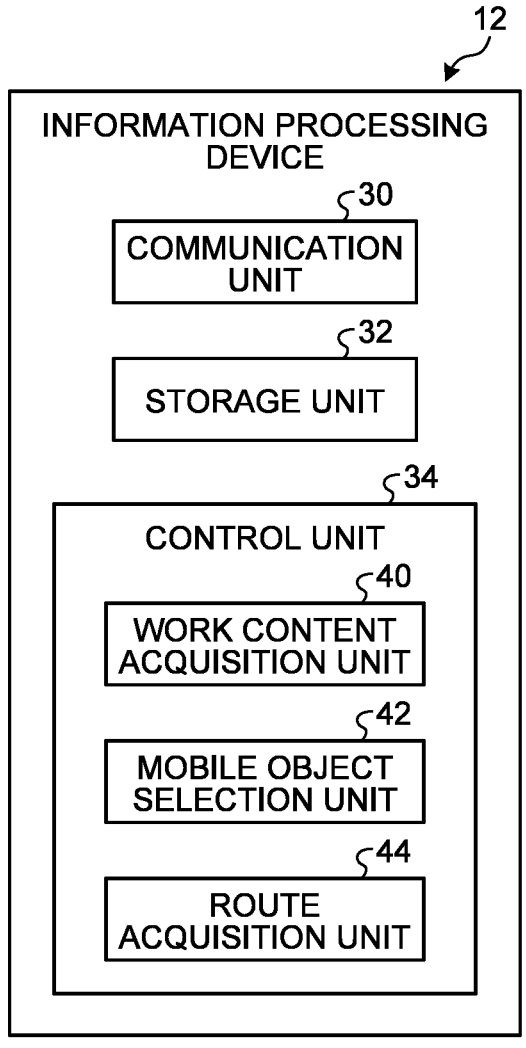
FIG. 3 is a schematic block diagram of an information processing device.

FIG. 3 is a schematic block diagram of the information processing device. The information processing device 12 is a device that is disposed in the facility W and at least performs an arithmetic operation of information related to movement of the mobile object 10 and the like, that is, what is called a ground system. However, a disposition position or the like of the information processing device 12 is optional, and is not limited to what is called a ground system. The information processing device 12 is a computer, and includes a communication unit 30, a storage unit 32, and a control unit 34 as illustrated in FIG. 3. The communication unit 30 is a module that is used by the control unit 34 to communicate with an external device such as the mobile object 10, and may include an antenna, for example. A communication scheme used by the communication unit 30 is wireless communication in the present embodiment, but the communication scheme may be optional. The storage unit 32 is a memory that stores various kinds of information such as a computer program or arithmetic content of the control unit 34, and includes at least one of a random access memory (RAM), a main storage device such as a read only memory (ROM), and an external storage device such as a hard disk drive (HDD), for example.

The control unit 34 is an arithmetic device, and includes an arithmetic circuit such as a central processing unit (CPU), for example. The control unit 34 includes a work content acquisition unit 40, a mobile object selection unit 42, and a route acquisition unit 44. The control unit 34 implements the work content acquisition unit 40, the mobile object selection unit 42, and the route acquisition unit 44 by reading out, from the storage unit 32, and executing a computer program (software), and performs processing thereof. The control unit 34 may perform the processing by one CPU, or may include a plurality of CPUs and perform the processing by the CPUs. At least part of the work content acquisition unit 40, the mobile object selection unit 42, and the route acquisition unit 44 may be implemented by a hardware circuit. A computer program for the control unit 34 stored in the storage unit 32 may be stored in a (non-transitory) computer-readable storage medium that can be read by the information processing device 12.

Work Content Acquisition Unit and Mobile Object Selection Unit

The work content acquisition unit 40 acquires information on work content, that is, information on the target object P to be conveyed. The work content acquisition unit 40 may acquire the work content by using an optional method. For example, the work content acquisition unit 40 may acquire the work content set by a management system (not illustrated). The management system herein may be a Warehouse Management System (WMS) or a back-end system such as another production management system, for example. The work content acquisition unit 40 specifies the disposition region AR1 in which the target object P is disposed and the conveyance region AR2 as the conveyance destination based on the information on the target object P in the work content. For example, the storage unit 32 stores the target object P, the disposition region AR1 in which the target object P is disposed, and the conveyance region AR2 as the conveyance destination in association with each other, and the work content acquisition unit 40 specifies the disposition region AR1 and the conveyance region AR2 by reading out the information from the storage unit 32. The mobile object selection unit 42 selects the mobile object 10 to be operated. For example, the mobile object selection unit 42 selects the mobile object 10 to be operated from among a plurality of the mobile objects belonging to the facility W. The mobile object selection unit 42 may select the mobile object 10 to be operated, using an optional method. For example, based on the disposition region AR1 specified by the work content acquisition unit 40, the mobile object selection unit 42 may select the mobile object 10 suitable for conveyance of the target object P in the disposition region AR1 as the mobile object 10 to be operated.

Route Acquisition Unit

The route acquisition unit 44 acquires information on a route of the mobile object 10, that is, information on the first route R1 toward the disposition region AR1 and information on the second route R2 toward the conveyance region AR2 herein. The route acquisition unit 44 transmits the acquired information on the first route R1 and the second route R2 to the mobile object 10 to be operated via the communication unit 30.

As illustrated in FIG. 1, the first route R1 is a track to a position (target position A1) at which a predetermined position and attitude of the mobile object 10 are achieved with respect to the disposition region AR1. The target position A1 can be assumed to be a position and an attitude at and with which the mobile object 10 can pick up the target object P assuming that the position and the attitude of the target object P are a standard position and attitude set in advance in the disposition region AR1. The first route R1 is set in advance for each of the disposition regions AR1, for example. The route acquisition unit 44 acquires, from the storage unit 32, for example, the first route R1 that is set for the disposition region AR1 specified by the work content acquisition unit 40. The first route R1 is set based on the coordinate system on a two-dimensional surface on the region AR (coordinate system of the region AR), so that the first route R1 is a track in the coordinate system of the region AR. However, the first route R1 is not limited thereto, but may be a track in a global coordinate system.

As illustrated in FIG. 1, the second route R2 is a track to a position (target position A2) at which a predetermined position and attitude of the mobile object 10 are achieved with respect to the conveyance region AR2. In the present embodiment, the second route R2 is preferably a track from the target position A1 to the target position A2. The target position A2 can be assumed to be a position and an attitude at and with which the target object P held by the mobile object 10 without misalignment (that is, the target object P held by the mobile object 10 at a predetermined position and with a predetermined attitude with respect to the mobile object 10) can be dropped in the conveyance region AR2. The second route R2 is set in advance for each of the conveyance regions AR2, for example. The route acquisition unit 44 acquires, from the storage unit 32, for example, the second route R2 that is set for the conveyance region AR2 specified by the work content acquisition unit 40. The second route R2 is set based on the coordinate system on a two-dimensional surface on the region AR (coordinate system of the region AR), so that the second route R2 is a track in the coordinate system of the region AR. However, the second route R2 is not limited thereto, but may be a track in the global coordinate system.

The first route R1 and the second route R2 are set in advance based on map information on the facility W. The map information on the facility W is information including positional information on an obstacle (such as a pillar) disposed in the facility W, a passage along which the mobile object 10 can travel, and the like, that is, information indicating a region in which the mobile object 10 can move in the region AR. The first route R1 and the second route R2 may be set also based on information about vehicle specifications of the mobile object 10 in addition to the map information on the facility W. The information about the vehicle specifications is, for example, specifications that influence a route along which the mobile object 10 can move, such as a size or a minimum turning radius of the mobile object 10. In a case in which the first route R1 and the second route R2 are set also based on the information about the vehicle specifications, the first route R1 and the second route R2 may be set for each mobile object. The first route R1 and the second route R2 may also be set by a person based on the map information, the information about the vehicle specifications, and the like, or may be automatically set by a device such as the information processing device 12 based on the map information, the information about the vehicle specifications, and the like. In a case of automatically setting the first route R1 and the second route R2, for example, a point desired to be passed through (Waypoint) may be designated, for example. In this case, the shortest first route R1 and second route R2 can be set to pass through the point desired to be passed through while avoiding an obstacle (a fixed object such as a wall).

The route acquisition unit 44 may set the first route R1 and the second route R2 without reading out the first route R1 and the second route R2 set in advance. In this case, the route acquisition unit 44 may generate, as the first route R1, a route from a current position of the mobile object 10 toward the disposition region AR1 based on the positional information on the mobile object 10 to be operated, the positional information on the disposition region AR1, and the map information on the facility W. Similarly, the route acquisition unit 44 may generate, as the second route R2, a route from the disposition region AR1 toward the conveyance region AR2 based on the positional information on the disposition region AR1, the positional information on the conveyance region AR2, and the map information on the facility W.

Control Device for Mobile Object

Figure 4:
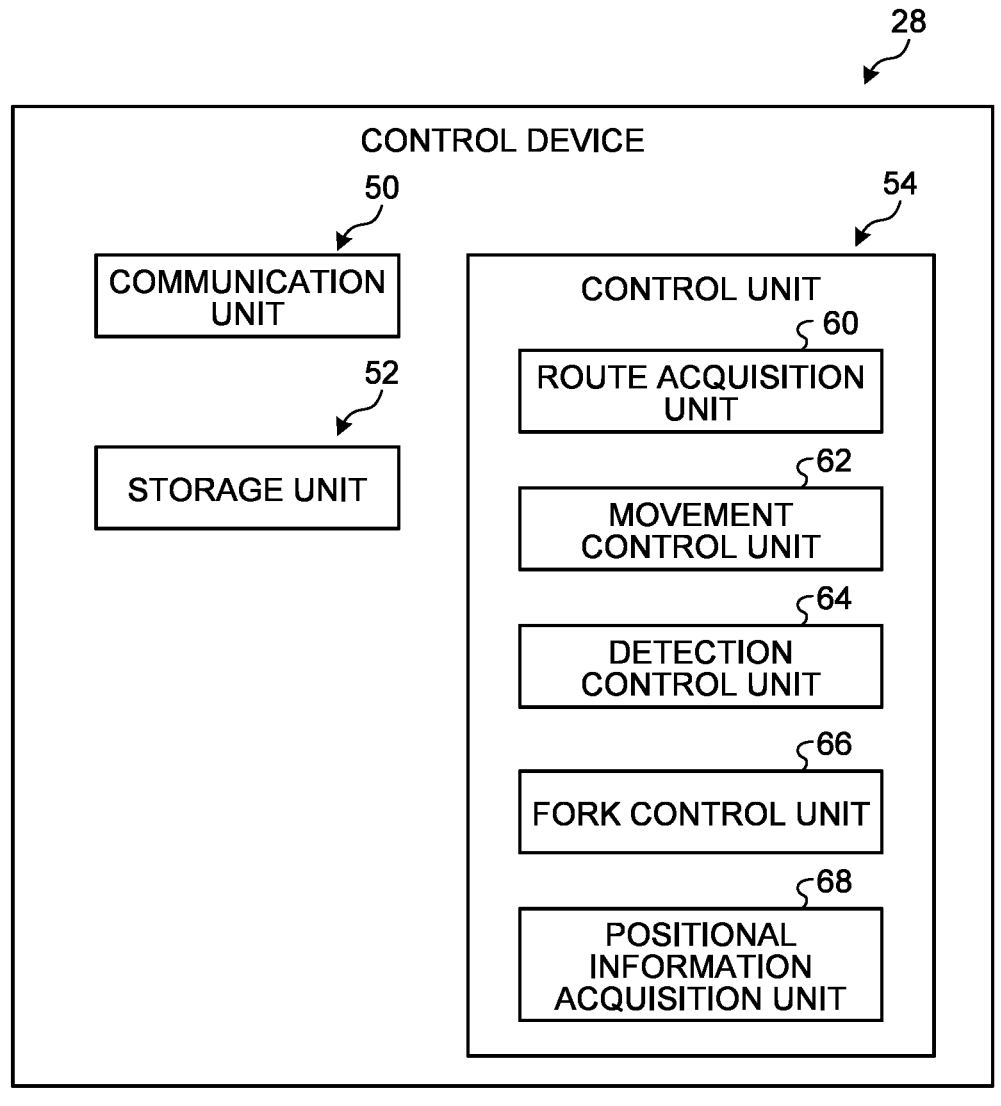
FIG. 4 is a schematic block diagram of a control device for the mobile object.

Next, the following describes the control device 28 for the mobile object 10. FIG. 4 is a schematic block diagram of the control device for the mobile object. The control device 28 is a device that controls the mobile object 10. The control device 28 is a computer, and includes a communication unit 50, a storage unit 52, and a control unit 54 as illustrated in FIG. 4. The communication unit 50 is a module that is used by the control unit 54 to communicate with an external device such as the information processing device 12, and may include an antenna and the like, for example. A communication scheme used by the communication unit 50 is wireless communication in the present embodiment, but the communication scheme may be optional. The storage unit 52 is a memory that stores various kinds of information such as a computer program or arithmetic content of the control unit 54, and includes at least one of a RAM, a main storage device such as a ROM, and an external storage device such as an HDD, for example.

The control unit 54 is an arithmetic device, and includes an arithmetic circuit such as a CPU, for example. The control unit 54 includes a route acquisition unit 60, a movement control unit 62, a detection control unit 64, a fork control unit 66, and a positional information acquisition unit 68. The control unit 54 implements the route acquisition unit 60, the movement control unit 62, the detection control unit 64, the fork control unit 66, and the positional information acquisition unit 68 by reading out, from the storage unit 52, and executing a computer program (software), and performs processing thereof. The control unit 54 may perform the processing by one CPU, or may include a plurality of CPUs and perform the processing by the CPUs. At least part of the route acquisition unit 60, the movement control unit 62, the detection control unit 64, the fork control unit 66, and the positional information acquisition unit 68 may be implemented by a hardware circuit. A computer program for the control unit 54 stored in the storage unit 52 may be stored in a (non-transitory) computer-readable storage medium that can be read by the control device 28.

Route Acquisition Unit

The route acquisition unit 60 acquires information on a route along which the mobile object 10 moves, that is, information on the first route R1 and the second route R2 herein. When the mobile object 10 is selected to be operated, the route acquisition unit 60 may acquire the information on the first route R1 and the second route R2 from the information processing device 12, or may read out the information on the first route R1 and the second route R2 previously stored in the storage unit 52. The route acquisition unit 60 does not necessarily acquire the first route R1 and the second route R2 from the information processing device 12, but may set the first route R1 and the second route R2 by itself.

Movement Control Unit

The movement control unit 62 controls movement of the mobile object 10 by controlling a moving mechanism such as a driving unit or a steering system of the mobile object 10. The movement control unit 62 causes the mobile object 10 to move along the first route R1 and the second route R2 acquired by the route acquisition unit 60. By successively grasping the positional information on the mobile object 10, the movement control unit 62 causes the mobile object 10 to move to pass through the first route R1 and the second route R2. A method of acquiring the positional information on the mobile object 10 is optional. For example, in the present embodiment, a detection body (not illustrated) is disposed in the facility W, and the movement control unit 62 acquires information about the position and the attitude of the mobile object 10 based on detection of the detection body. Specifically, the mobile object 10 emits laser light toward the detection body, and receives reflected light of the laser light reflected from the detection body to detect the position and the attitude of the mobile object 10 in the facility W. However, a method of acquiring the information about the position and the attitude of the mobile object 10 is not limited to using the detection body. For example, Simultaneous Localization and Mapping (SLAM) may be used.

Detection Control Unit

The detection control unit 64 causes the position of the target object P with respect to the mobile object 10, that is, a relative position of the target object P with respect to the mobile object 10 to be detected. Processing performed by the detection control unit 64 will be described later.

Fork Control Unit

The fork control unit 66 controls an operation of the fork 24 of the mobile object 10. Processing performed by the fork control unit 66 will be described later.

Positional Information Acquisition Unit

The positional information acquisition unit 68 acquires the positional information on the target object P based on a detection result of the position of the target object P obtained by the detection control unit 64. The positional information on the target object P is information indicating the position of the target object P with respect to the mobile object 10 in a state in which the fork 24 disposed on the mobile object 10 is inserted into the hole Pb formed on the target object P. Processing performed by the positional information acquisition unit 68 will be described later.

Processing Performed by Control Device

Next, the following describes processing performed by the control device 28 at the time when the mobile object 10 loads the target object P in the disposition region AR1 and unloads the target object P in the conveyance region AR2.

Movement Along First Route

As illustrated in FIG. 1, the movement control unit 62 causes the mobile object 10 to move to the target position A1 along the first route R1 acquired by the route acquisition unit 60. When the mobile object 10 arrives at the target position A1, the fork control unit 66 moves the fork 24 to insert the fork 24 (hooks 24A and 24B) into the hole Pb, and picks up the target object P. Details about control for picking up the target object P will be described later.

Update of First Route

The first route R1 is a route that is set in advance based on the map information and the like before the mobile object 10 starts to move along the first route R1, but the route acquisition unit 60 may update the first route R1 set in advance. In this case, for example, the detection control unit 64 causes the sensor 26A to detect the position and the attitude of the target object P while the mobile object 10 is moving along the first route R1, and the route acquisition unit 60 updates the first route R1 based on the position and the attitude of the target object P. Specific description will be made hereinafter.

The detection control unit 64 causes the sensor 26A to detect the target object P in the disposition region AR1 by causing the sensor 26A to perform detection toward the disposition region AR1 the position of which is known. For example, in a case in which the sensor 26A is configured to emit laser light, the detection control unit 64 causes the sensor 26A to perform scanning in a lateral direction (horizontal direction) while causing the sensor 26A to emit laser light toward the disposition region AR1 side during a period in which the mobile object 10 is moving along the first route R1. The target object P reflects the laser light from the sensor 26A. The sensor 26A receives reflected light from the target object P. The detection control unit 64 acquires a point group as a set of measuring points based on a detection result of the reflected light received by the sensor 26A. In the present embodiment, based on the detection result of the reflected light, the detection control unit 64 calculates, as the measuring point, a position (coordinates) of a point at which the reflected light is reflected. The detection control unit 64 extracts a straight line by using, for example, a RANSAC algorithm based on the measuring points (point group), and calculates a position and an attitude of the straight line as the position and the attitude of the target object P. However, a calculation method for the position and the attitude of the target object P based on the detection result of the sensor 26A may be optional.

The detection control unit 64 may cause the target object P to be detected at an optional timing when the mobile object 10 is positioned on the first route R1. For example, the detection control unit 64 may cause the target object P to be detected while the mobile object 10 is moving at an optional position on the first route R1, or may cause the target object P to be detected when the mobile object 10 is stopping at an optional position on the first route R1.

The route acquisition unit 60 updates the first route R1 based on the position and the attitude of the target object P detected by the detection control unit 64. The route acquisition unit 60 sets, as a new target position A1, a position at which a predetermined position and attitude of the mobile object 10 are achieved with respect to the target object P the position and the attitude of which are detected by the detection control unit 64, and sets a route to the new target position A1 as an updated first route R1. The movement control unit 62 switches the first route R1 before being updated to the updated first route R1, and causes the mobile object 10 to move along the updated first route R1. However, update processing for the first route R1 is not necessarily performed.

Movement Along Second Route

When the mobile object 10 picks up the target object P, the movement control unit 62 causes the mobile object 10 to move to the target position A2 along the second route R2 acquired by the route acquisition unit 60. When the mobile object 10 arrives at the target position A2, the fork control unit 66 moves the fork 24 to drop the target object P held by the fork 24 in the conveyance region AR2.

Control for Picking Up Target Object

Figure 5:
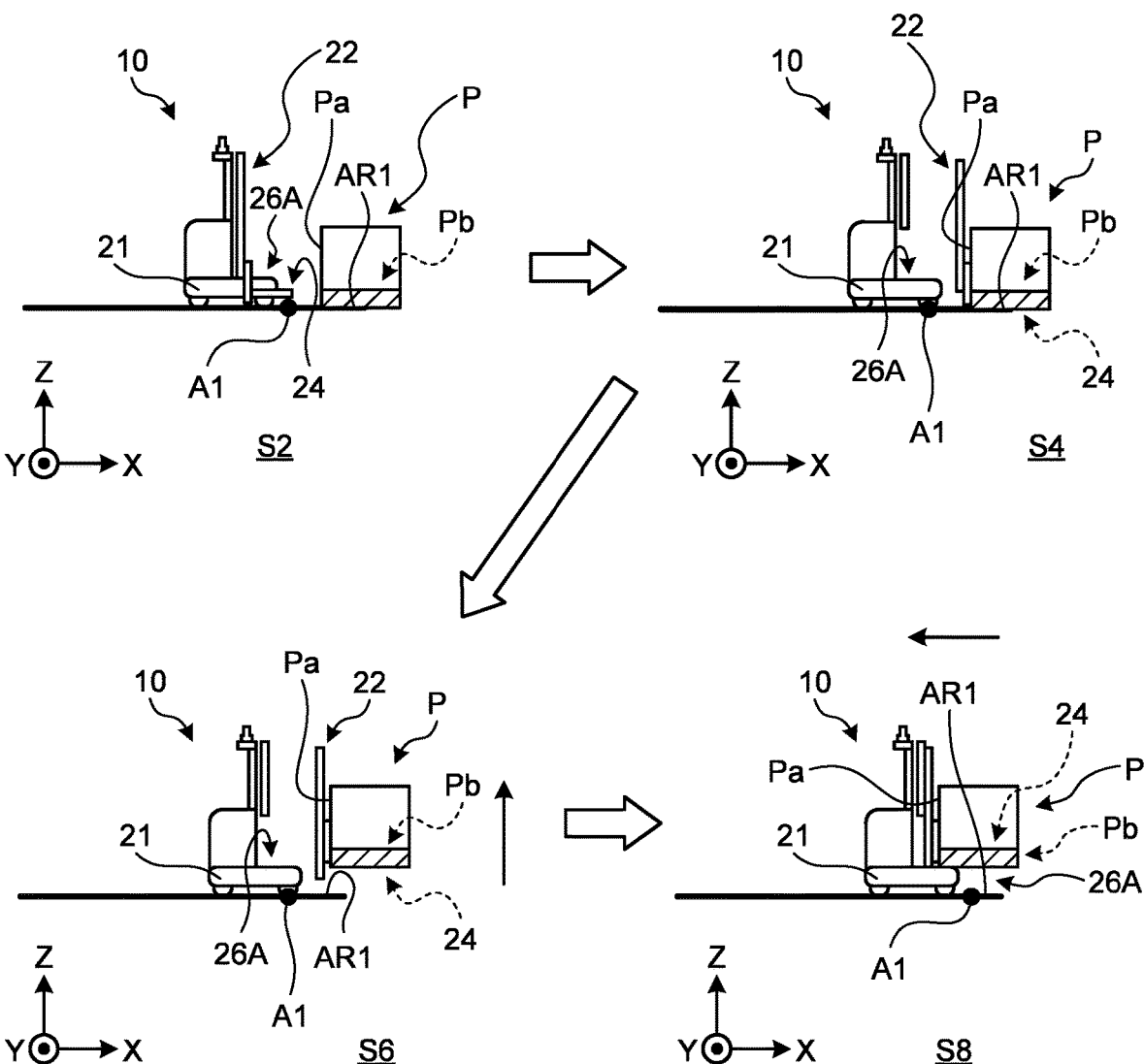
FIG. 5 is a schematic diagram for explaining an example of an operation of the mobile object at the time of picking up a target object.

FIG. 5 is a schematic diagram for explaining an example of an operation of the mobile object at the time of picking up the target object. The following describes an example in which the mobile object 10 is positioned on a side opposite to the X-direction of the target object P (disposition region AR1), and picks up the target object P that is positioned on a front direction side (first direction side) of the mobile object 10, that is, positioned on the X-direction side herein. That is, the following describes an example in which the target position A1 at which the mobile object 10 arrives is positioned on a side opposite to the X-direction of the target object P. As illustrated in FIG. 5, when the mobile object 10 arrives at the target position A1 (Step S2), the fork control unit 66 moves the fork 24 toward the X-direction side (first direction side) to insert the fork 24 into the hole Pb of the target object P (Step S4). In the present embodiment, the mast 22 and the fork 24 are integrally moved in the front and rear direction, so that it can be said that the mast 22 and the fork 24 are moved toward the X-direction side to insert the fork 24 into the hole Pb of the target object P. The fork control unit 66 may move the fork 24 in at least one of the upper and lower direction (in this example, the Z-direction or the opposite side of the Z-direction) and the lateral direction (in this example, the Y-direction or the opposite side of the Y-direction) to align positions of the fork 24 and the hole Pb. In this case, for example, the fork control unit 66 may successively detect the position of the hole Pb with a sensor such as a camera, and move the fork 24 to align the position of the hole Pb with the position of the fork 24 by feedback control.

After the fork 24 is inserted into the hole Pb, by moving the fork 24 toward the Z-direction side to move the target object P toward an upper direction side, a bottom surface of the target object P is moved away from the disposition region AR1, and the target object P is held by the fork 24 (Step S6). Thereafter, the fork 24 is moved toward the opposite side of the X-direction, and the position of the fork 24 is returned to an original position (Step S8). Accordingly, pickup of the target object P is completed.

The fork control unit 66 picks up the target object P as described above. However, a control method for the fork 24 for picking up the target object P is not limited thereto, but may be optional.

Position Detection for Target Object P

In the present embodiment, the detection control unit 64 detects the position of the target object P with respect to the mobile object 10, and the positional information acquisition unit 68 acquires the positional information on the target object P indicating the position of the target object with respect to the mobile object 10 in a state in which the fork 24 is inserted into the hole Pb based on the detection result of the position of the target object P obtained by the detection control unit 64. The state in which the fork 24 is inserted into the hole Pb is not limited to a state in which the entire part from a distal end to a base end of the fork 24 is positioned within the hole Pb, but may mean a state in which at least part of the fork 24 is positioned within the hole Pb. The following specifically describes this processing.

Figure 6:
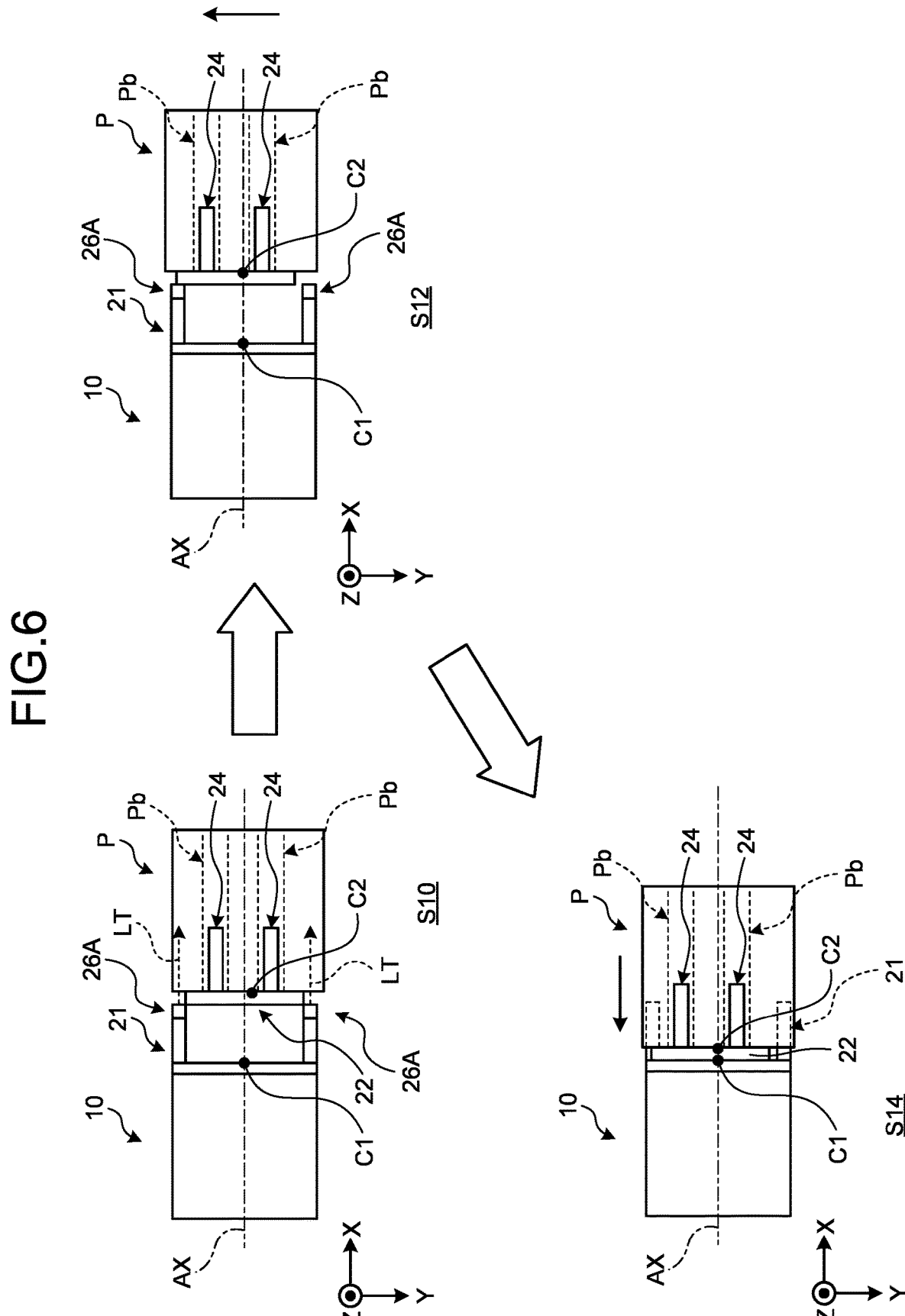
FIG. 6 is a schematic diagram for explaining processing of acquiring positional information on the target object.

FIG. 6 is a schematic diagram for explaining processing of acquiring the positional information on the target object. The detection control unit 64 detects the position of the target object P with respect to the mobile object 10 (relative position), that is, the position of the target object P in a coordinate system of the mobile object 10. The detection control unit 64 detects the position of the target object P with respect to the mobile object 10 in the lateral direction (second direction) intersecting with the front direction (first direction). By causing the sensor 26A to detect the target object P, the detection control unit 64 detects the position of the target object P with respect to the mobile object 10 in the Y-direction. In the present embodiment, as illustrated in FIG. 6 at Step S10, the detection control unit 64 causes the sensor 26A to detect the position of the target object P in the state in which the fork 24 of the mobile object 10 is inserted into the hole Pb. That is, it can be said that the detection control unit 64 causes the position of the target object P with respect to the mobile object 10 in the state in which the fork 24 is inserted into the hole Pb to be detected. More specifically, it is preferable that the detection control unit 64 causes the sensor 26A to detect the position of the target object P in a state in which the target object P is held by the fork 24 and the target object P is positioned on a forward side of the sensor 26A (in the example of FIG. 5, the state at Step S6). That is, in the present embodiment, the sensor 26A is disposed at the distal end of the straddle leg 21, so that it is preferable to cause the position of the target object P to be detected before the fork 24 (target object P) is returned to the opposite side of the X-direction. The sensor 26A that is caused to detect the target object P is disposed at a position opposed to the target object P, and is disposed on the opposite side of the X-direction of the target object P to face the X-direction side in the example of FIG. 6. In the present embodiment, the detection control unit 64 causes each of the sensors 26A disposed on the distal ends of the pair of straddle legs 21 to detect the position of the target object P, but the embodiment is not limited thereto. The detection control unit 64 may cause at least one of the sensors 26A disposed on the distal ends of the straddle legs 21 to detect the position of the target object P, or may cause the sensor 26A disposed at an optional position to detect the position of the target object P. In a case in which the sensor 26A is disposed at a point where the position of the target object P can be detected even in a state in which the fork 24 (target object P) is returned to the opposite side of the X-direction (the state at Step S8), the position of the target object P may be caused to be detected in the state at Step S8.

For example, in a case in which the sensor 26A is configured to emit laser light, the detection control unit 64 causes the sensor 26A to emit laser light to the target object P. The target object P reflects the emitted laser light as reflected light, and the sensor 26A detects (receives) the reflected light from the target object P. The detection control unit 64 detects the position of the target object P with respect to the mobile object 10 based on a detection result of the reflected light obtained by the sensor 26A.

More specifically, in the present embodiment, the detection control unit 64 causes the sensor 26A to emit laser light LT toward a direction on a side on which the target object P is present. In the present embodiment, the detection control unit 64 does not cause the laser light LT to scan but fixes an irradiation direction of the laser light LT. It is preferable that the detection control unit 64 causes the irradiation direction of the laser light LT to be a direction along the X-direction (front direction of the mobile object 10), but the embodiment is not limited thereto. The irradiation direction of the laser light LT may be an optional direction toward a front direction side of the mobile object 10. In a case of emitting the laser light LT as described above, if the target object P is positioned on the X-direction side with respect to the sensor 26A, that is, if the position of the sensor 26A overlaps with the position of the target object P in the Y-direction, the laser light LT hits the target object P, and the sensor 26A can receive reflected light from the target object P. On the other hand, if the target object P is not positioned on the X-direction side with respect to the sensor 26A, that is, the position of the sensor 26A is shifted from the position of the target object P in the Y-direction, the laser light LT does not hit the target object P, and the sensor 26A cannot receive the reflected light from the target object P. Thus, the detection control unit 64 can determine whether the target object P is positioned in the X-direction of the sensor 26A based on the reflected light from the target object P detected (received) by the sensor 26A. In this way, by determining whether the target object P is positioned in the X-direction of the sensor 26A based on the reflected light from the target object P detected by the sensor 26A, the detection control unit 64 can detect the position of the target object P with respect to the mobile object 10 in the Y-direction.

For example, the detection control unit 64 causes the sensor 26A to emit the laser light LT in the front direction (X-direction) while causing the fork control unit 66 to move the fork 24 in the lateral direction (the Y-direction or a direction opposite to the Y-direction). In this case, it can be said that an end part in the lateral direction of the target object P is positioned in the front direction of the sensor 26A between a timing when the reflected light from the target object P can be received and a timing when the reflected light cannot be received. Thus, it can be said that the detection control unit 64 detects the position of the end part in the lateral direction of the target object P, and more specifically, detects the position in the lateral direction of the target object P by detecting switching between the timing when the reflected light from the target object P can be detected and the timing when the reflected light cannot be detected. That is, "the detection control unit 64 detects the position of the target object P" means not only calculating the position of the target object P with respect to the mobile object 10 by arithmetic operation based on the detection result obtained by the sensor 26A, but may mean detecting the reflected light from the target object P, more preferably, detecting switching between the timing when the reflected light from the target object P can be detected and the timing when the reflected light cannot be detected. The detection control unit 64 may determine that the sensor 26A has detected (received) the reflected light from the target object P in a case in which intensity of the light received by the sensor 26A is equal to or larger than a threshold.

A detection method for the position in the Y-direction of the target object P by the detection control unit 64 is not limited to the method described above. For example, the detection control unit 64 may detect the position and the attitude of the target object P by emitting the laser light LT to scan in the lateral direction. In this case, the detection method may be the same as that at the time of updating the first route R1.

As described above, the detection control unit 64 detects the position in the Y-direction of the target object P in the state in which the fork 24 is inserted into the hole Pb, so that the positional information acquisition unit 68 acquires, as the positional information on the target object P, the detection result of the position in the Y-direction of the target object P in the state in which the fork 24 is inserted into the hole Pb obtained by the detection control unit 64. Alternatively, the detection control unit 64 may also detect the position in the Y-direction of the target object P with respect to the mobile object 10 in a state in which the fork 24 is not inserted into the hole Pb. In this case, by correcting the position in the Y-direction of the target object P in the state in which the fork 24 is not inserted into the hole Pb based on a movement amount in the Y-direction of the fork 24 at the time when the fork 24 is inserted into the hole Pb, for example, the positional information acquisition unit 68 may calculate and acquire, as the positional information on the target object P, the position in the Y-direction of the target object P in the state in which the fork 24 is inserted into the hole Pb.

Position Adjustment for Target Object P

In the present embodiment, the fork control unit 66 causes the target object P to move in the lateral direction by causing the fork 24 to move in the lateral direction (the Y-direction or the opposite side of the Y-direction) in the state in which the fork 24 is inserted into the hole Pb based on the positional information on the target object P (position in the Y-direction of the target object P). Due to this, the fork control unit 66 adjusts the position of the target object P with respect to the mobile object 10 in the lateral direction. FIG. 6 illustrates an example of causing the target object P to move toward the opposite side of the Y-direction by causing the fork 24 to move toward the opposite side of the Y-direction (Step S12). In the present embodiment, it is preferable that the fork control unit 66 causes the target object P to move so that a distance in the lateral direction between a center position C1 in the lateral direction of the mobile object 10 and a center position C2 in the lateral direction of the target object P is equal to or smaller than a predetermined value, for example. The predetermined value herein may be optional. In this case, for example, it is assumed that an end part position is the position in the lateral direction of the fork 24 at a timing when the reflected light cannot be detected immediately after the reflected light from the target object P has been detected at the time when the laser light LT is emitted from the sensor 26A while the fork 24 is moved in the lateral direction (for example, the Y-direction) side. The fork control unit 66 adjusts the position of the target object P with respect to the mobile object 10 in the lateral direction by causing the fork 24 to move toward the opposite side of the lateral direction (for example, the opposite side of the Y-direction) by a predetermined distance (for example, several millimeters) with respect to the end part position, and stopping the movement of the fork 24. Due to this, the distance between the center position C2 of the target object P mounted on the stopped fork 24 and the center position C1 of the mobile object 10 becomes equal to or smaller than the predetermined value, and more specifically, the center positions C1 and C2 can be substantially coaxially positioned (on an axis AX) in the X-direction. Thus, by performing control as described above, the center position C2 of the target object P can be appropriately aligned with the center position C1 of the mobile object 10. However, an adjustment method for the position of the target object P with respect to the mobile object 10 is not limited thereto, but may be optional. For example, the positional information acquisition unit 68 may calculate coordinates of the center position C2 of the target object P in a coordinate system of the mobile object 10 based on the positional information on the target object P, and may cause the target object P to move so that the distance in the Y-direction between the center position C2 of the target object P and the center position C1 of the mobile object 10 becomes equal to or smaller than the predetermined value.

When position adjustment in the lateral direction for the target object P is completed, the mobile object 10 moves along the second route R2 while keeping the position in the lateral direction of the target object P, and drops the target object P at the target position A2. The process of dropping the target object P may be performed by performing the process of picking up the target object P illustrated in FIG. 5 in reverse order. In the present embodiment, as illustrated in FIG. 6 at Step S12, position adjustment in the Y-direction for the target object P is performed in a state in which the fork 24 projects toward the X-direction side, and the mobile object 10 starts to move to the second route R2 after returning the fork 24 to the opposite side of the X-direction as illustrated at Step S14 thereafter. However, the embodiment is not limited thereto. For example, after returning the fork 24 to the opposite side of the X-direction, the mobile object 10 may adjust the position in the Y-direction of the target object P and move along the second route R2. For example, at an optional timing after returning the fork 24 to the opposite side of the X-direction and starting to move along the second route R2, the mobile object 10 may adjust the position in the Y-direction of the target object P. Alternatively, the mobile object 10 may readjust the position in the Y-direction of the target object P by performing position detection for the object P again after adjusting the position in the Y-direction of the target object P and before dropping the target object P. In this case, position detection performed again for the target object P and readjustment for the position in the Y-direction of the target object P may be performed by using the same method as that described above.

Processing Flow

Next, the following describes a processing flow for the control device 28 of the mobile object 10 described above. FIG. 7 is a flowchart for explaining the processing flow for the control device according to the first embodiment. As illustrated in FIG. 7, the control device 28 acquires the information on the route (the first route R1 and the second route R2) by the route acquisition unit 60 (Step S20), and causes the mobile object 10 to move along the first route R1 by the movement control unit 62 (Step S22). When the mobile object 10 arrives at the target position A1, the fork control unit 66 controls the fork 24 to pick up the target object P by inserting the fork 24 into the hole Pb of the target object P disposed in the disposition region AR1 (Step S24). The control device 28 causes the detection control unit 64 to detect the position of the target object P with respect to the mobile object 10 by controlling the sensor 26A (Step S26), and acquires the detection result of the position of the target object P as the positional information on the target object P in the state in which the fork 24 is inserted into the hole Pb by the positional information acquisition unit 68 (Step S28). The fork control unit 66 determines whether position adjustment in the lateral direction for the target object P is required based on the positional information on the target object P in the state in which the fork 24 is inserted into the hole Pb (Step S30). If it is determined that position adjustment is required (Yes at Step S30), the fork control unit 66 adjusts the position in the lateral direction of the target object P by side shifting, that is, by moving the fork 24 in the lateral direction (Step S32). A criterion for determining whether position adjustment is required may be optional. After performing position adjustment for the target object P, the control device 28 causes the mobile object 10 on which the target object P is mounted to move along the second route R2 by the movement control unit 62 (Step S34). When the mobile object 10 arrives at the target position A2, the control device 28 controls the fork 24 by the fork control unit 66 to drop the target object P in the conveyance region AR2 (Step S36). If it is determined that position adjustment is not required (No at Step S30), the process also proceeds to Step S34.

Effects

Herein, it is possible to pick up the target object P by inserting the fork 24 into the hole Pb, but in a case in which the picked up target object P is misaligned with the mobile object 10, there is the possibility that the target object P cannot be appropriately conveyed such that the target object P cannot be appropriately disposed in the conveyance region AR2, for example. For example, in a case in which the target objects P are required to be disposed to be closer to each other as much as possible such as a case in which a distance between the conveyance regions AR2 set on the ground is small, a case in which the conveyance regions AR2 are set on a shelf having a narrow width, or a case in which a distance between the conveyance regions AR2 set on a load-carrying platform of the vehicle is small, misalignment of the picked up target object P with the mobile object 10 particularly becomes problematic. On the other hand, in the present embodiment, by causing the sensor 26A to detect the position of the target object P with respect to the mobile object 10, the positional information on the target object P with respect to the mobile object 10 in the state in which the fork 24 is inserted into the hole Pb is acquired. By acquiring the positional information on the target object P in the state in which the fork 24 is inserted into the hole Pb, it becomes possible to appropriately adjust the position of the target object P in a state of being held by the mobile object 10 based on the positional information. For example, also in a case in which the target objects P are required to be disposed to be closer to each other as much as possible as described above, the target object P can be appropriately disposed in the conveyance region AR2, and the target object P can be appropriately conveyed.

Other Examples

In the example of the present embodiment, the position of the target object P picked up by the mobile object 10 is adjusted based on the positional information on the target object P in the state in which the fork 24 is inserted into the hole Pb. However, a method of using the positional information on the target object P is not limited thereto, but may be optional. For example, the first route R1 and the second route R2 may be updated based on the positional information on the target object P in the state in which the fork 24 is inserted into the hole Pb. The following describes an example of updating the second route R2.

As described above, the second route R2 is a route that is set in advance based on the map information and the like. However, in the present example, the route acquisition unit 60 updates, based on the positional information on the target object P in the state in which the fork 24 is inserted into the hole Pb, the second route R2 set in advance. In this case, for example, the route acquisition unit 60 corrects, based on the position of the target object P in the state in which the fork 24 is inserted into the hole Pb, the position of the target position A2 set in advance (refer to FIG. 1), and calculates a route to the corrected target position A2 as the updated second route R2. For example, the route acquisition unit 60 may set, as the corrected target position A2, a position obtained by shifting the target position A2 set in advance corresponding to a difference between the position of the mobile object 10 and the position of the target object P in the state in which the fork 24 is inserted into the hole Pb. The movement control unit 62 causes the mobile object 10 to move along the updated second route R2. A unit that calculates the updated second route R2 is not limited to the route acquisition unit 60 of the mobile object 10. For example, the route acquisition unit 44 of the information processing device 12 may calculate the updated second route R2.

FIG. 8 is a flowchart for explaining a processing flow for the control device according to another example of the first embodiment. As illustrated in FIG. 8, the processing flow from the start to Step S28, and Step S34 and the steps subsequent thereto for the control device 28 in the present example is the same as the processing flow in the first embodiment (FIG. 7). In the present example, after Step S28, the control device 28 determines whether the second route R2 is required to be updated based on the positional information on the target object P (Step S30a). If it is determined that the second route R2 is required to be updated (Yes at Step S30a), the control device 28 updates the second route R2 based on the positional information on the target object P (Step S32a), and causes the mobile object 10 to move along the updated second route R2 (Step S34). On the other hand, if it is determined that the second route R2 is not required to be updated (No at Step S30a), the control device 28 does not update the second route R2, and causes the mobile object 10 to move along the second route R2 set in advance (Step S34). A criterion for determining whether the second route R2 is required to be updated may be optional.

As described above, position adjustment for the target object P is performed based on the positional information on the target object P in the first embodiment, and the second route R2 is updated based on the positional information on the target object P in the present example. Alternatively, both of position adjustment for the target object P based on the positional information on the target object P and update of the second route R2 based on the positional information on the target object P may be performed.

Figure 9:
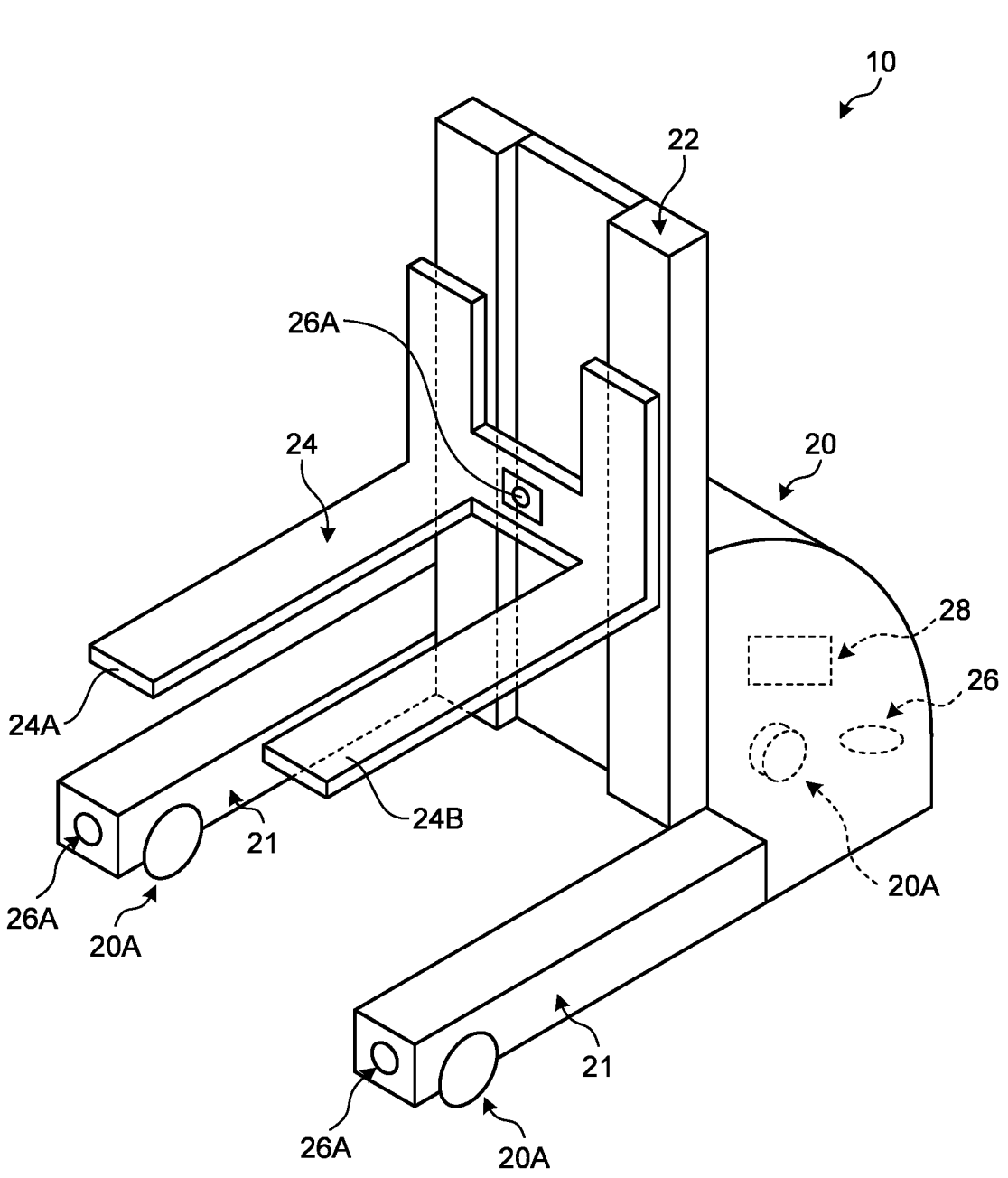
FIG. 9 is a schematic diagram for explaining another example of a position of a sensor.

In the first embodiment, position detection for the object P is performed by the sensor 26A disposed at the distal end of the straddle leg 21. However, the position of the sensor used for position detection for the object P is not limited thereto, but may be optional. FIG. 9 is a schematic diagram for explaining another example of the position of the sensor. For example, as illustrated in FIG. 9, the sensor 26A used for position detection for the object P may be disposed on an upper direction side of the straddle leg 21. In this case, for example, the sensor 26A used for position detection for the object P may be disposed at a position of a backrest of the mast 22. The position of the backrest means a position in the mast 22 on a rear direction side of the mobile object 10 with respect to the base end of the fork 24. A method of position detection for the object P performed by the sensor 26A may be the same as that of position detection in the first embodiment.

By using the sensor 26A disposed at the distal end of the straddle leg 21 as in the first embodiment, for example, the target object P passes through in front of the sensor 26A in a process of picking up the target object P disposed on a floor face, so that the target object P is not required to be moved only for detection performed by the sensor 26A, and working efficiency can be improved. On the other hand, by disposing the sensor 26A used for position detection for the object P on the upper direction side of the straddle leg 21 as in the present example, for example, in a case in which the target object P is disposed on an upper side of the straddle leg 21 such as on a shelf, the target object P passes through in front of the sensor 26A in a process of picking up the target object P. Thus, in the present example, the target object P is not required to be moved only for detection performed by the sensor 26A at the time of picking up the target object P that is disposed on the upper side, so that working efficiency can be improved.

Second Embodiment

Next, the following describes a second embodiment. The second embodiment is different from the first embodiment in that a sensor 26B, which is a camera, performs position detection for the object P. In the second embodiment, the same configurations as those in the first embodiment will not be described again.

Figure 10:
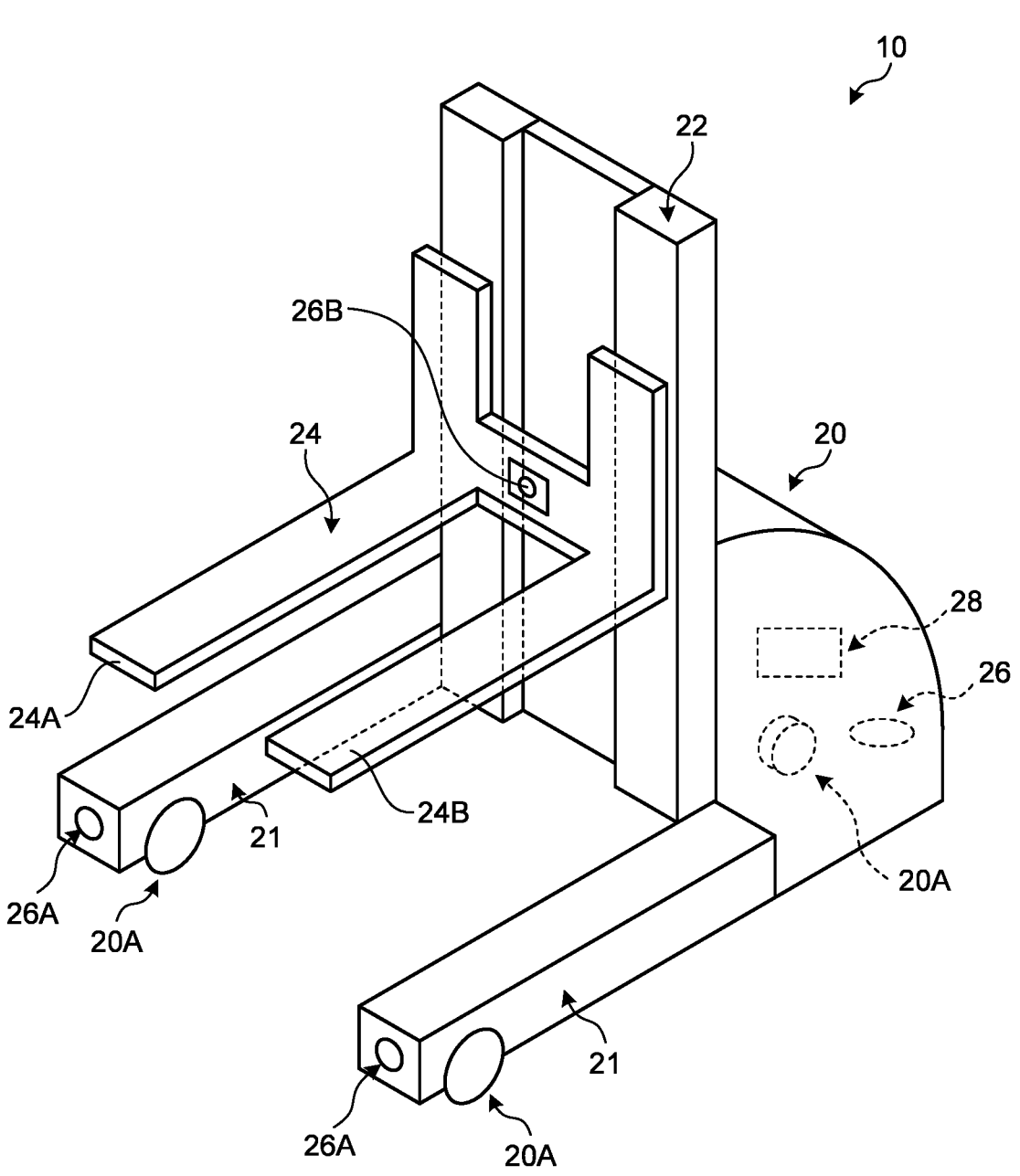
FIG. 10 is a schematic diagram of a mobile object according to a second embodiment.

FIG. 10 is a schematic diagram of the mobile object according to the second embodiment. As illustrated in FIG. 10, the sensor 26B is disposed on the mobile object 10 in the second embodiment. The sensor 26B is disposed to face a front side of the mobile object 10 on the front side of the mobile object 10. In the example of FIG. 10, the sensor 26B is disposed at the position of the backrest of the mast 22, but the position at which the sensor 26B is disposed may be optional. The sensor 26B is a camera that can perform imaging in an imaging range, for example, may be a Time Of Flight (TOF) camera that can measure a distance to an object to be imaged. However, the sensor 26B may be any sensor that can detect the position and the attitude of the target object P.

Figure 11:
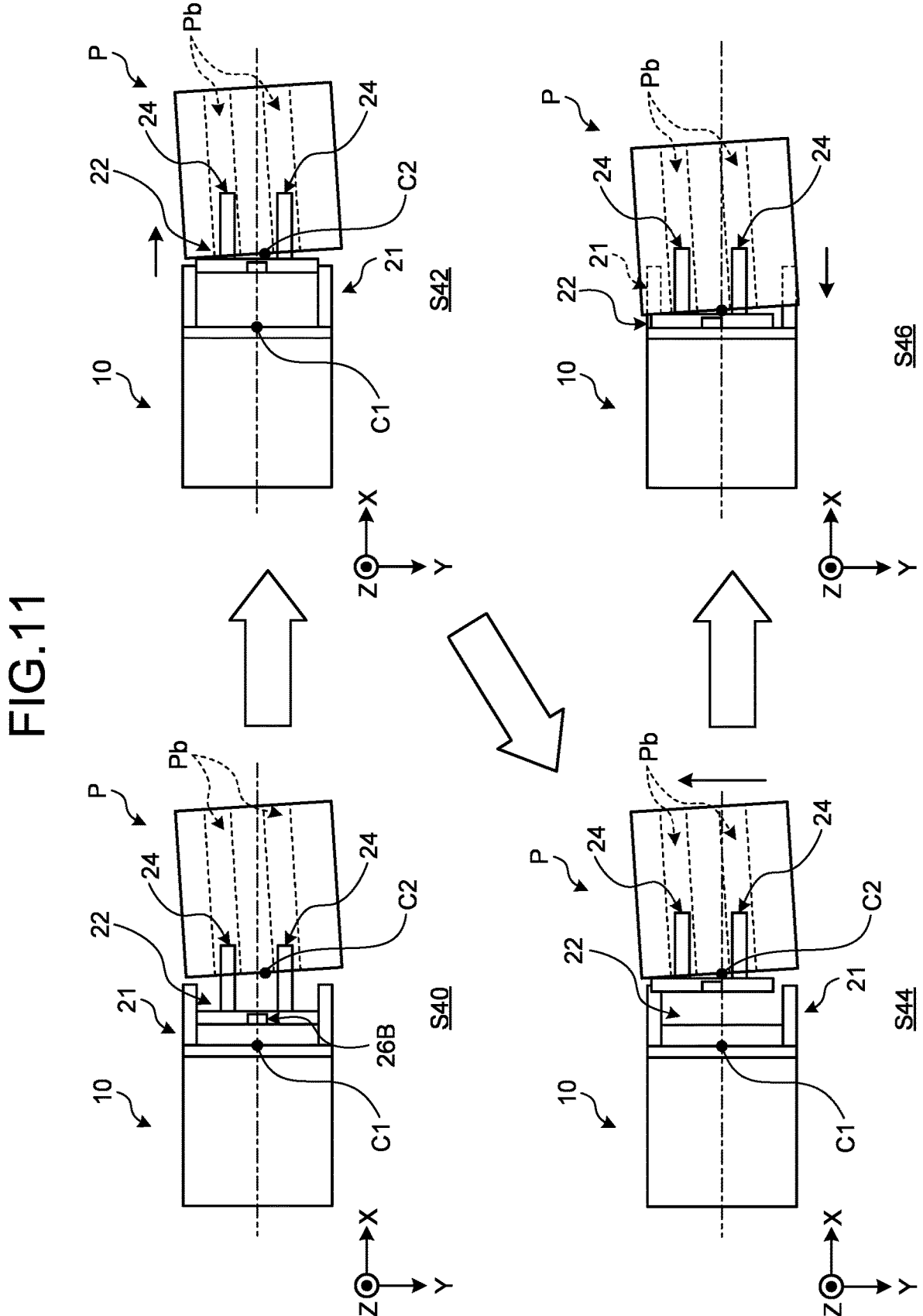
FIG. 11 is a schematic diagram for explaining processing of acquiring positional information on a target object according to the second embodiment.

FIG. 11 is a schematic diagram for explaining processing of acquiring the positional information on the target object according to the second embodiment. As illustrated in FIG. 11 at Steps S40 and S42, in the second embodiment, the detection control unit 64 causes the sensor 26B to detect the target object P while causing the fork 24 to move in the X-direction to be inserted into the hole Pb. For example, by causing the sensor 26B to image the target object P, the detection control unit 64 causes the position and the attitude of the target object P with respect to the mobile object 10 to be detected, that is, causes the position and the attitude of the target object P in the coordinate system of the mobile object 10 to be detected. The positional information acquisition unit 68 acquires, as the positional information on the target object P, the position and the attitude of the target object P with respect to the mobile object 10 in the state in which the fork 24 is inserted into the hole Pb based on a detection result of the position and the attitude of the target object P with respect to the mobile object 10.

In the second embodiment, the detection control unit 64 may cause the position and the attitude of the target object P with respect to the mobile object 10 in the state in which the fork 24 is inserted into the hole Pb to be detected, and the positional information acquisition unit 68 may acquire the detection result as the positional information on the target object P. Alternatively, for example, the detection control unit 64 may cause the position and the attitude of the target object P with respect to the mobile object 10 in the state in which the fork 24 is not inserted into the hole Pb to be detected, and the positional information acquisition unit 68 may calculate the positional information on the target object P (the position and the attitude of the target object P with respect to the mobile object 10) in the state in which the fork 24 is inserted into the hole Pb based on the detection result. In this case, by correcting the position and the attitude of the target object P in the state in which the fork 24 is not inserted into the hole Pb based on relative positions of the fork 24 and the hole Pb, for example, the positional information acquisition unit 68 may calculate and acquire, as the positional information on the target object P, the position and the attitude of the target object P in the state in which the fork 24 is inserted into the hole Pb.

After acquiring the positional information on the target object P, similarly to the first embodiment, the fork control unit 66 may adjust the position of the target object P in the lateral direction by moving the fork 24 in the lateral direction based on the position of the target object P with respect to the mobile object 10 in the state in which the fork 24 is inserted into the hole Pb (Steps S44 and S46 in FIG. 11). Furthermore, in the second embodiment, it is preferable to update the second route R2 based on the attitude of the target object P with respect to the mobile object 10 in the state in which the fork 24 is inserted into the hole Pb. In this case, for example, the route acquisition unit 60 corrects, based on the attitude of the target object P in the state in which the fork 24 is inserted into the hole Pb, the position and the attitude of the target position A2 set in advance (refer to FIG. 1), and calculates a route to the corrected target position A2 as the updated second route R2. For example, the route acquisition unit 60 may set, as the corrected target position A2, a position and attitude obtained by shifting the target position A2 set in advance corresponding to misalignment of the attitude of the target object P with respect to the mobile object 10 in the state in which the fork 24 is inserted into the hole Pb. The movement control unit 62 causes the mobile object 10 to move along the updated second route R2. A unit that calculates the updated second route R2 is not limited to the route acquisition unit 60 of the mobile object 10. For example, the route acquisition unit 44 of the information processing device 12 may calculate the updated second route R2.

As described above, in the second embodiment, the position in the lateral direction of the mounted target object P is adjusted based on the position of the target object P with respect to the mobile object 10 while the second route R2 is updated based on the attitude of the target object P with respect to the mobile object 10. Thus, according to the second embodiment, even in a case in which the target object P is mounted on the mobile object 10 while being misaligned therewith, the target object P can be disposed in the conveyance region AR2 with high accuracy. However, such processing is not necessarily performed. For example, the second route R2 is not necessarily updated based on the attitude of the target object P with respect to the mobile object 10. For example, the second route R2 is not updated in a case in which the attitude of the target object P with respect to the mobile object 10 is smaller than a predetermined threshold, but the second route R2 may be updated only in a case in which the attitude of the target object P with respect to the mobile object 10 is equal to or larger than the predetermined threshold. For example, in the second embodiment, the second route R2 may be updated based on the position and the attitude of the target object P with respect to the mobile object 10 without adjusting the position in the lateral direction of the mounted target object P. That is, in this case, the target position A2 may be corrected corresponding to misalignment of the position and the attitude of the target object P with respect to the mobile object 10, and a route to the corrected target position A2 may be set as the updated second route R2.

In the first embodiment, only the position of the target object P with respect to the mobile object 10 is detected, but the embodiment is not limited thereto. Similarly to the second embodiment, the position and the attitude of the target object P with respect to the mobile object 10 may be detected. In this case, for example, by causing the sensor 26A according to the first embodiment to scan in the lateral direction while emitting the laser light LT, a point group indicating positions of points at which reflected light is reflected may be acquired, and the position and the attitude of the target object P may be detected based on the point group. In this case, also in the first embodiment, the position in the lateral direction of the target object P may be adjusted based on the position of the target object P while the second route R2 is updated based on the attitude of the target object P, similarly to the second embodiment. For example, also in the first embodiment, the second route R2 is not updated in a case in which the attitude of the target object P with respect to the mobile object 10 is smaller than the predetermined threshold, and the second route R2 may be updated only in a case in which the attitude of the target object P with respect to the mobile object 10 is equal to or larger than the predetermined threshold. For example, also in the first embodiment, the second route R2 may be updated based on the position and the attitude of the target object P without adjusting the position in the lateral direction of the mounted target object P.

Additionally, for example, the first embodiment and the second embodiment may be combined with each other. In this case, for example, the position of the target object P may be detected by the sensor 26A as in the first embodiment, and the attitude of the target object P may be detected by the sensor 26B as in the second embodiment. The processing after detecting the position and the attitude of the target object P is the same as that in the second embodiment, so that the description thereof will not be repeated.

Figure 12:
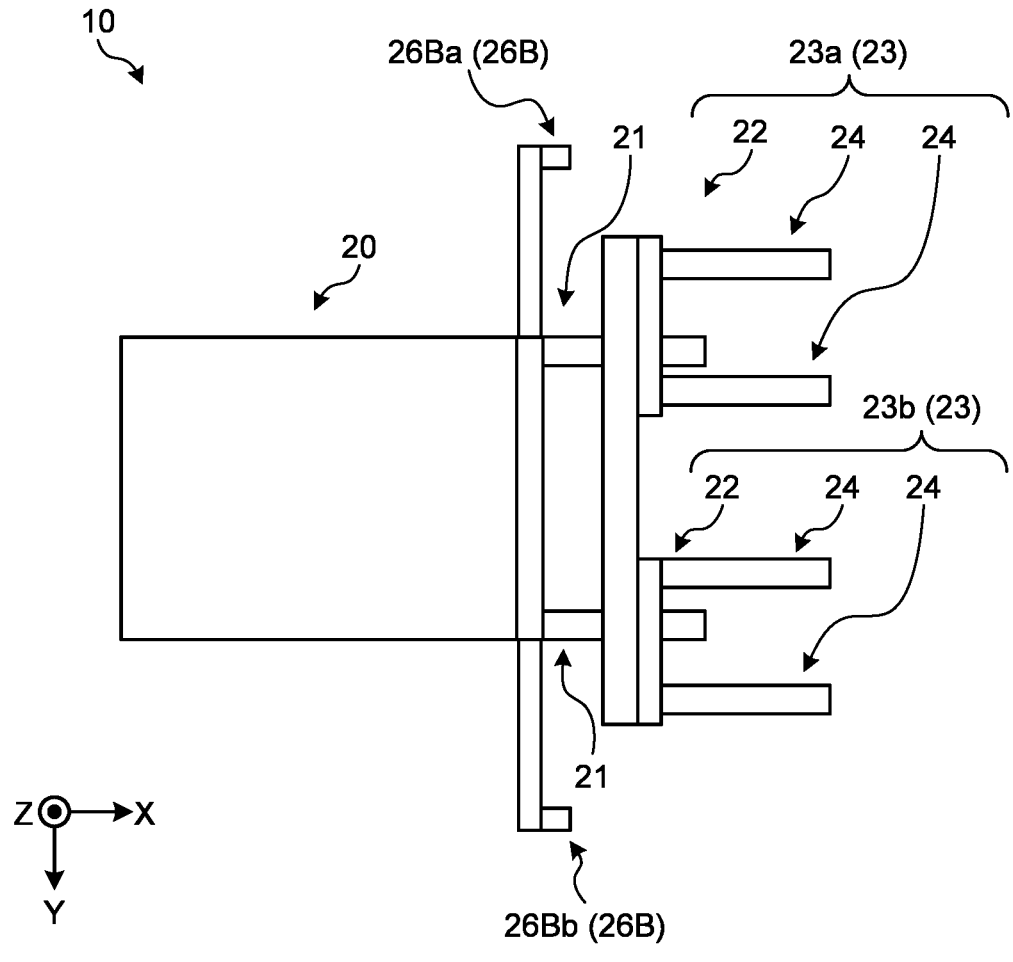
FIG. 12 is a diagram for explaining an example of a case in which a plurality of pairs of forks are disposed.

In the above description, only one pair of forks 24 is disposed on the mobile object 10, but a plurality of pairs of forks 24 may be disposed. FIG. 12 is a diagram for explaining an example of a case in which a plurality of pairs of forks are disposed. As illustrated in FIG. 12, a plurality of fork units 23 (pairs of forks 24) each including the mast 22 and the pair of forks 24 may be arranged side by side in the lateral direction in the mobile object 10. In the example of FIG. 12, a fork unit 23a and a fork unit 23b are disposed as the fork units 23. However, the number of the fork units 23 is not limited to two, but may be three or more. The fork units 23 integrally move in the front and rear direction, the lateral direction, and the upper and lower direction, but the embodiment is not limited thereto. The fork units 23 may be configured to separately move in at least one of the front and rear direction, the lateral direction, and the upper and lower direction.

In a case of disposing the multiple fork units 23, the sensor 26B is preferably disposed on each of the fork units 23. In the example of FIG. 12, a sensor 26Ba is disposed at a position on a rear side of the fork unit 23a, the position projecting toward one side in the lateral direction (the opposite side of the Y-direction in the example of FIG. 12) from the vehicle body 20. Additionally, a sensor 26Bb is disposed at a position on a rear side of the fork unit 23b, the position projecting toward the other side in the lateral direction (the Y-direction side in the example of FIG. 12) from the vehicle body 20. In this case, the sensor 26Ba detects the target object P to be picked up by the fork unit 23a, and the sensor 26Bb detects the target object P to be picked up by the fork unit 23b. However, the positions of the respective sensors 26Ba and 26Bb are not limited to the example of FIG. 12, but may be optional. The configuration of disposing the multiple fork units 23 may also be applied to the mobile object 10 according to the first embodiment or the other examples of the first embodiment.

Third Embodiment

Next, the following describes a third embodiment. The third embodiment is different from the first embodiment in that the position of the target object P with respect to the mobile object 10 is detected by bringing a surface (side surface) in the lateral direction of the fork 24 inserted into the hole Pb into contact with an inner peripheral surface of the hole Pb. In the third embodiment, the same configurations as those in the first embodiment will not be described again. The third embodiment can also be applied to the second embodiment.

Figure 13:
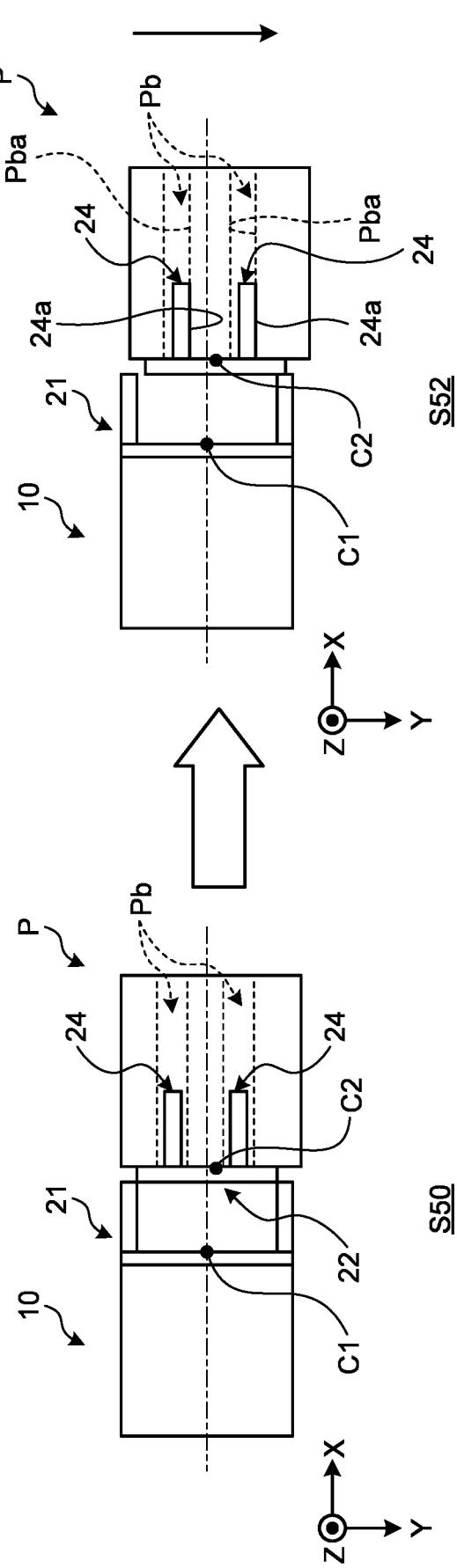
FIG. 13 is a schematic diagram for explaining processing of acquiring positional information on a target object according to a third embodiment.

FIG. 13 is a schematic diagram for explaining processing of acquiring the positional information on the target object according to the third embodiment. In the third embodiment, the fork control unit 66 causes the fork 24 to be inserted into the hole Pb as illustrated in FIG. 13 at Step S50, and causes the fork 24 to move in the lateral direction (the Y-direction in the example of FIG. 13) in a state in which the fork 24 is inserted into the hole Pb as illustrated at Step S52. More specifically, the fork control unit 66 causes the fork 24 to move in the lateral direction in a state in which the fork 24 is inserted into the hole Pb and the fork 24 does not hold the target object P. Even when the fork 24 is moved in the lateral direction, the target object P does not move following the fork 24 because the fork 24 does not hold the target object P, and the fork 24 moves in the lateral direction within the hole Pb. The detection control unit 64 detects the position of the target object P with respect to the mobile object 10 in the lateral direction by detecting whether a side surface 24a in the lateral direction of the fork 24 is brought into contact with an inner peripheral surface Pba of the hole Pb. That is, in a case in which the side surface 24a is brought into contact with the inner peripheral surface Pba, it can be said that positions of the side surface 24a of the fork 24 and the hole Pb in the lateral direction are identical to each other. Accordingly, based on the position in the lateral direction of the side surface 24a of the fork 24 at a timing when the side surface 24a is brought into contact with the inner peripheral surface Pba detected by the detection control unit 64, the positional information acquisition unit 68 can acquire, as the positional information on the target object P, the position in the lateral direction of the target object P in the coordinate system of the mobile object 10. In this case, for example, the positional information acquisition unit 68 may previously acquire information on a reference point of the target object P with respect to the position of the hole Pb (the center position C2, a position of an end part in the lateral direction of the target object P, and the like), and calculate the position of the reference point of the target object P in the coordinate system of the mobile object 10 based on the position of the side surface 24a at the timing when the side surface 24a is brought into contact with the inner peripheral surface Pba and the position of the reference point of the target object P with respect to the position of the hole Pb.

The detection control unit 64 may detect whether the side surface 24a of the fork 24 is brought into contact with the inner peripheral surface Pba of the hole Pb using an optional method. For example, a touch sensor may be disposed on the side surface 24a, and in a case in which the touch sensor detects contact in the state in which the fork 24 is inserted into the hole Pb, the detection control unit 64 may detect (determine) that the side surface 24a is brought into contact with the inner peripheral surface Pba of the hole Pb. Alternatively, for example, a sensor that detects a hydraulic pressure for operating the fork 24 to move in the lateral direction may be disposed, and in a case in which a hydraulic pressure value becomes equal to or larger than a predetermined threshold while the fork 24 is being moved in the lateral direction, the detection control unit 64 may detect (determine) that the side surface 24a is brought into contact with the inner peripheral surface Pba of the hole Pb.

After acquiring the positional information on the target object P, similarly to the first embodiment, the fork control unit 66 may adjust the position of the target object P in the lateral direction based on the positional information on the target object P, and may update the second route R2 based on the positional information on the target object P.

Figure 14:
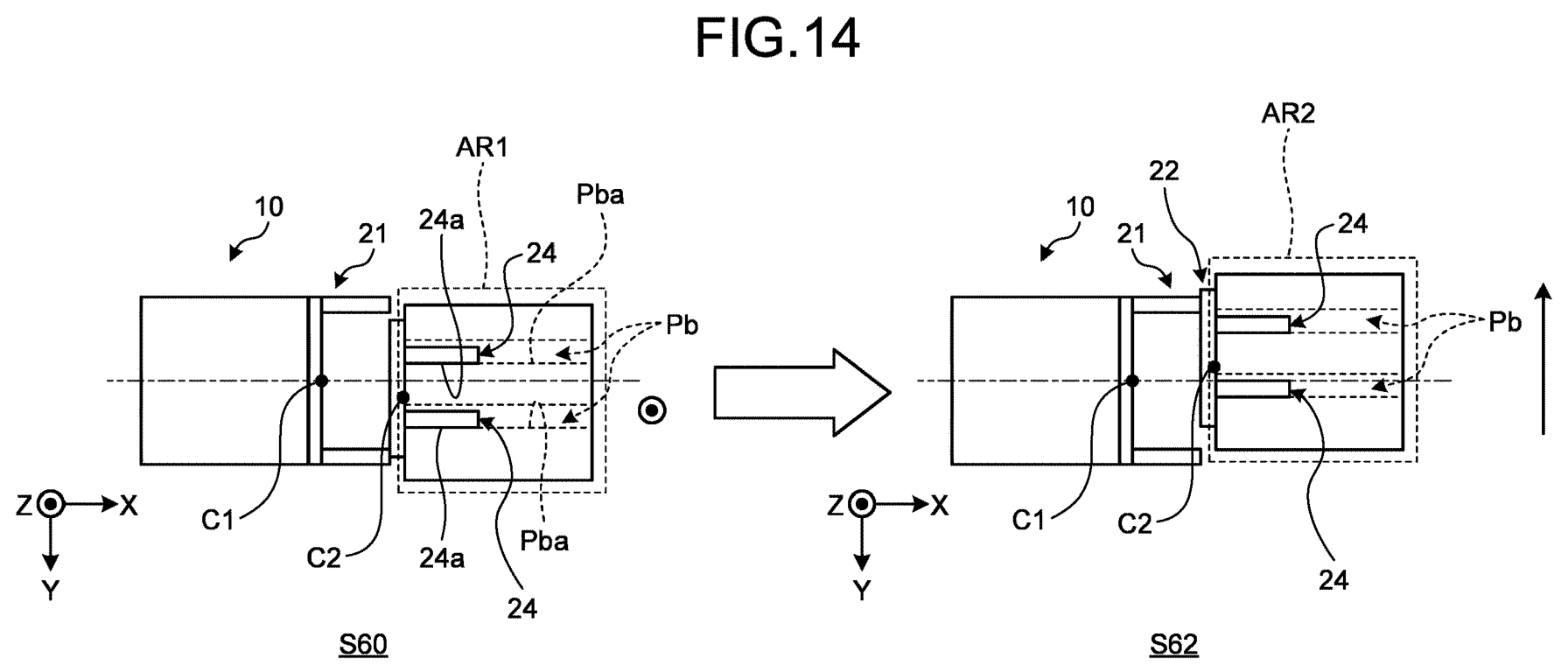
Figure 15:
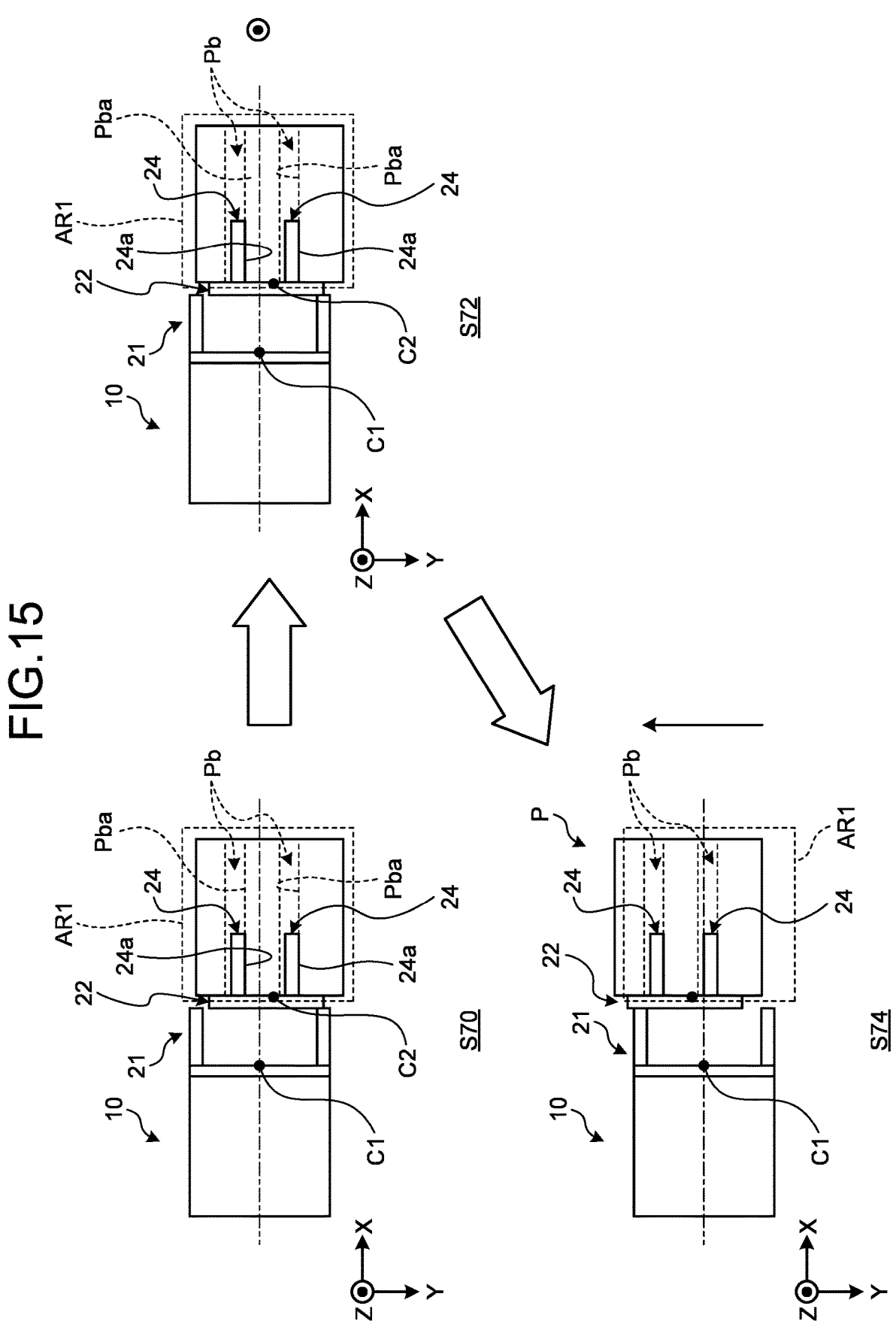
FIG. 15 is a schematic diagram for explaining an example of picking up the target object.

FIG. 14 and FIG. 15 are schematic diagrams for explaining examples of picking up the target object. After acquiring the positional information on the target object P, the fork control unit 66 picks up the target object P by causing the fork 24 to move in the upper direction in the state in which the fork 24 is inserted into the hole Pb. In this case, for example, as illustrated in FIG. 14 at Step S60, the fork control unit 66 may cause the fork 24 to move in the Z-direction to pick up the target object P while keeping a state in which the side surface 24a on the Y-direction side is in contact with the inner peripheral surface Pba of the hole Pb. That is, the fork control unit 66 may cause the fork 24 to pick up the target object P while keeping a state in which the fork 24 is side-shifted in the Y-direction and the side surface 24a is brought into contact with the inner peripheral surface Pba. As illustrated at Step S62, the fork control unit 66 then causes the fork 24 to be side-shifted toward the opposite side of the Y-direction to drop the target object P. In this way, by causing the fork 24 to be side-shifted in the Y-direction to pick up the target object P, for example, it is possible to keep a large allowance for causing the fork 24 to be side-shifted toward the opposite side of the Y-direction at the time of dropping the target object P. Due to this, at the time of dropping the target object P, it is possible to drop the target object P to be close to the opposite side of the Y-direction by causing the fork 24 to be side-shifted toward the opposite side of the Y-direction, and it is possible to dispose the target objects P to be closer to each other toward the opposite side of the Y-direction.

For example, in a case in which there is an obstacle (for example, the other target object P) in the vicinity of the Y-direction side, when the target object P is lifted up while keeping a state in which the side surface 24a on the Y-direction side is in contact with the inner peripheral surface Pba, the fork 24 may be side-shifted toward the opposite side of the Y-direction before returning the fork 24 to the opposite side of the X-direction. Due to this, the target object P can be picked up by moving the target object P toward the opposite side of the Y-direction, so that it is possible to appropriately prevent contact between the target object P and the obstacle on the Y-direction side. That is, for example, as illustrated in FIG. 15 at Steps S70 and S72, the fork control unit 66 lifts up the target object P by causing the fork 24 to move in the Z-direction while keeping a state in which the side surface 24a on the Y-direction side is in contact with the inner peripheral surface Pba of the hole Pb. Thereafter, as illustrated at Step S74, after causing the fork 24 to be side-shifted toward the opposite side of the Y-direction to be moved away from the obstacle on the Y-direction side, the fork control unit 66 may return the fork 24 to the opposite side of the X-direction to complete pickup of the target object P.

Effects

As described above, the control method for the mobile object 10 according to the present disclosure is a control method for the mobile object 10 that automatically moves, and includes a step of detecting the position of the target object P to be conveyed with respect to the mobile object 10, and a step of acquiring the positional information on the target object P indicating the position of the target object P with respect to the mobile object 10 in the state in which the fork 24 disposed on the mobile object 10 is inserted into the hole Pb formed on the target object P based on the detection result of the position of the target object P. In this control method, the position of the target object P with respect to the mobile object 10 is detected to acquire the positional information on the target object P with respect to the mobile object 10 in the state in which the fork 24 is inserted into the hole Pb. By acquiring the positional information on the target object P in the state in which the fork 24 is inserted into the hole Pb, it is possible to appropriately convey the target object P based on the positional information while considering misalignment of the position of the target object P in a state of being mounted on the mobile object 10.

At the step of detecting the position of the target object P, detected is the position of the target object P with respect to the mobile object 10 in the second direction (lateral direction) intersecting with the first direction (front direction) toward the target object P from the mobile object 10, and at the step of acquiring the positional information on the target object P, as the positional information, acquired is the information indicating the position of the target object P with respect to the mobile object 10 in the lateral direction in the state in which the fork 24 is inserted into the hole Pb. With this control method, the position of the target object P in the lateral direction is detected, so that it is possible to appropriately convey the target object P while considering misalignment of the position of the target object P in the lateral direction, for example.

At the step of detecting the position of the target object P, by emitting the laser light LT to the target object P and detecting reflected light from the target object P by the first sensor (sensor 26A) disposed on the mobile object 10, at least one of the position and the attitude of the target object P with respect to the mobile object 10 is detected. With this control method, by detecting the position of the target object P by detecting the reflected light of the laser light LT, the position or the attitude of the target object P can be appropriately detected.

At the step of detecting the position of the target object P, by causing the first sensor (sensor 26A) to emit the laser light LT in a state in which the irradiation direction is fixed, and determining whether the target object P is positioned in the first direction of the first sensor based on the reflected light from the target object P, the position of the target object P with respect to the mobile object 10 in the second direction is detected. Accuracy in position detection with the laser light LT may be deteriorated when a distance to the target object P is reduced. However, in this control method, whether the target object P is positioned in the first direction is determined by fixing the irradiation direction of the laser light LT and determining whether the reflected light is detected. Even if the distance to the target object P is reduced, whether the reflected light is detected can be detected with high accuracy, so that the position of the target object P can be appropriately detected with this control method.

At the step of detecting the position of the target object P, the attitude of the target object P with respect to the mobile object 10 is also detected. At the step of acquiring the positional information on the target object P, the information indicating the attitude of the target object P with respect to the mobile object 10 in the state in which the fork 24 is inserted into the hole Pb is also acquired as the positional information. By detecting the attitude of the target object P in addition to the position of the target object P, for example, it is possible to appropriately convey the target object P while considering misalignment of the attitude of the target object P.

At the step of detecting the position of the target object P, by imaging the target object P by the second sensor (sensor 26B) disposed on the mobile object 10, at least one of the position and the attitude of the target object P with respect to the mobile object 10 is detected. By imaging the target object P by the second sensor, it is possible to appropriately detect the position or the attitude of the target object P in a state of being mounted on the mobile object 10.

At the step of detecting the position of the target object P, the position of the target object P with respect to the mobile object 10 is detected by bringing the side surface 24a in the second direction (lateral direction) of the fork 24 inserted into the hole Pb into contact with the inner peripheral surface Pba of the hole Pb. By detecting the position of the target object P due to contact, it is possible to appropriately detect the position of the target object P in a state of being mounted on the mobile object 10.

This control method further includes a step of adjusting the position of the target object P with respect to the mobile object 10 in the second direction by moving the target object P in the second direction by moving the fork 24 toward the second direction (lateral direction) side in the state in which the fork 24 is inserted into the hole Pb based on the positional information on the target object P, and a step of unloading the target object P in a state in which the position of the target object P in the second direction is adjusted. By adjusting the position of the target object P based on the positional information on the target object P in the state in which the fork 24 is inserted into the hole Pb, it is possible to appropriately unload the target object P while considering misalignment of the position of the target object P, for example.

This control method further includes a step of acquiring the route (second route R2) toward the conveyance region AR2 in which the target object P is unloaded that is set based on the positional information on the target object P, a step of causing the mobile object 10 to move along the second route R2, and a step of unloading the target object P in the conveyance region AR2. By updating the second route R2 based on the positional information on the target object P, it is possible to appropriately unload the target object P while considering misalignment of the position of the target object P, for example.

The mobile object 10 according to the present disclosure is an object that automatically moves, and includes the detection control unit 64 that causes the position of the target object P to be conveyed with respect to the mobile object 10 to be detected, and the positional information acquisition unit 68 that acquires the positional information on the target object P indicating the position of the target object P with respect to the mobile object 10 in the state in which the fork 24 disposed on the mobile object 10 is inserted into the hole Pb formed on the target object P based on the detection result of the position of the target object P. By acquiring the positional information on the target object P in the state in which the fork 24 is inserted into the hole Pb, the mobile object 10 can appropriately convey the target object P while considering misalignment of the position of the target object P in a state of being mounted on the mobile object 10.

The embodiments of the present disclosure have been described above, but the embodiments are not limited thereto. The constituent elements described above encompass a constituent element that is easily conceivable by those skilled in the art, substantially the same constituent element, and what is called an equivalent. Additionally, the constituent elements described above can be appropriately combined with each other. Furthermore, the constituent elements can be variously omitted, replaced, or modified without departing from the gist of the embodiments described above.

REFERENCE SIGNS LIST

10 Mobile object
12 Information processing device
24 Fork
26A, 26B Sensor
60 Route acquisition unit
62 Movement control unit
64 Detection control unit
66 Fork control unit
68 Positional information acquisition unit
AR1 Disposition region
AR2 Conveyance region
P Target object
Pb Hole
R1 First route
R2 Second route

The invention claimed is:
1. A control method for a mobile object that automatically moves, the control method comprising:

detecting a position of a target object to be conveyed which is placed in a disposition region with respect to the mobile object in a second direction intersecting with a first direction toward the target object from the mobile object;

acquiring, based on a detection result of the position of the target object, positional information on the target object indicating the position of the target object with respect to the mobile object in the second direction in a state in which a fork disposed on the mobile object is inserted into a hole formed on the target object;

moving the fork into the hole, and picking up the target object which is placed in the disposition region;

adjusting, based on the positional information, the position of the target object with respect to the mobile object in the second direction by causing the fork to move toward the second direction side, in a state of picking up the target object, to move the target object in the second direction to reach an adjusting position where a distance between a center positions of the mobile object and the target object is equal to or smaller than a predetermined value in the second direction, so that the mobile object moves along a route, without correcting the route based on the adjusted positional information, towards the conveyance region;

causing the mobile object to move along the route towards a conveyance region which is different from the disposition region, in which the position of the target object is maintained at the adjusting position; and unloading the target object in a state in which the position of the target object is maintained at the adjusting position, wherein the method further including:

detecting a position, by emitting laser light by a first sensor disposed on the mobile object in a state in which an irradiation direction is fixed while moving the fork in the second direction, as an end part position of the fork in the second direction at a timing when reflected light from the target object can not be detected immediately after the reflected light from the target object was detected, and moving the fork a predetermined distance with respect to the end part position such that the target object reaches to the adjusting position.

2. The control method for the mobile object according to claim 1, wherein, the detecting of the position of the target object includes further detecting an attitude of the target object with respect to the mobile object, and the acquiring of the positional information on the target object includes further acquiring, as the positional information, information indicating the attitude of the target object with respect to the mobile object in a state in which the fork is inserted into the hole.

3. The control method for the mobile object according to claim 1, wherein the detecting of the position of the target object includes detecting at least one of the position and an attitude of the target object with respect to the mobile object by imaging the target object by a second sensor disposed on the mobile object.

4. The control method for the mobile object according to claim 1, wherein, the detecting of the position of the target object includes detecting the position of the target object with respect to the mobile object by bringing a side surface in the second direction of the fork inserted into the hole into contact with an inner peripheral surface of the hole.

5. The control method for the mobile object according to claim 1, the control method further comprising:

adjusting the position of the target object with respect to the mobile object in the second direction by causing the fork to move toward the second direction side to move the target object in the second direction in a state in which the fork is inserted into the hole based on the positional information; and unloading the target object in a state in which the position of the target object in the second direction is adjusted.

6. The control method for the mobile object according to claim 1, the control method further comprising:

acquiring a route toward a disposition region in which the target object is unloaded that is set based on the positional information;

causing the mobile object to move along the route; and unloading the target object in the disposition region.

7. A mobile object that automatically moves, the mobile object comprising:

a detection control unit configured to cause a position of a target object to be conveyed which is placed in a disposition region with respect to the mobile object to be detected in a second direction intersecting with a first direction toward the target object from the mobile object;

a positional information acquisition unit configured to acquire positional information on the target object indicating the position of the target object with respect to the mobile object in the second direction in a state in which a fork disposed on the mobile object is inserted into a hole formed on the target object based on a detection result of the position of the target object; and a fork control unit configured to move the fork into the hole, and pick up the target object which is placed in the disposition region; and a positional information unit configured to adjust, based on the positional information, the position of the target object with respect to the mobile object in the second direction by causing the fork to move toward the second direction side, in a state of picking up the target object, to move the target object in the second direction to reach an adjusting position where a distance between a center positions of the mobile object and the target object is equal to or smaller than a predetermined value in the second direction, so that the mobile object moves along a route, without correcting the route based on the adjusted positional information, towards the conveyance region, wherein the mobile object is moved along the route towards a conveyance region which is different from the disposition region, in which the position of the target object is maintained at the adjusting position, the target object is unloaded in a state in which the position of the target object is maintained at the adjusting position, the positional information acquisition unit is further configured to detect a position, by emitting laser light by a first sensor disposed on the mobile object in a state in which an irradiation direction is fixed while moving the fork in the second direction, as an end part position of the fork in the second direction at a timing when reflected light from the target object can not be detected immediately after the reflected light from the target object was detected, and the positional information unit is further configured to cause the forks to move a predetermined distance with respect to the end part position such that the target object reaches to the adjusting position.

8. A non-transitory computer-readable storage medium storing a computer program for causing a computer to perform a control method for a mobile object that automatically moves, the computer program comprising:

detecting a position of a target object to be conveyed which is placed in a disposition region with respect to the mobile object in a second direction intersecting with a first direction toward the target object from the mobile object;

acquiring, based on a detection result of the position of the target object, positional information on the target object indicating the position of the target object with respect to the mobile object in the second direction in a state in which a fork disposed on the mobile object is inserted into a hole formed on the target object;

moving the fork into the hole, and picking up the target object which is placed in the disposition region;

adjusting, based on the positional information, the position of the target object with respect to the mobile object in the second direction by causing the fork to move toward the second direction side, in a state of picking up the target object, to move the target object in the second direction to reach an adjusting position where a distance between a center positions of the mobile object and the target object is equal to or smaller than a predetermined value in the second direction, so that the mobile object moves along a route, without correcting the route based on the adjusted positional information, towards the conveyance region;

causing the mobile object to move along the route towards a conveyance region which is different from the disposition region, in which the position of the target object is maintained at the adjusting position; and unloading the target object in a state in which the position of the target object is maintained at the adjusting position, wherein the computer program further including:

detecting a position, by emitting laser light by a first sensor disposed on the mobile object in a state in which an irradiation direction is fixed while moving the fork in the second direction, as an end part position of the fork in the second direction at a timing when reflected light from the target object can not be detected immediately after the reflected light from the target object was detected, and moving the fork a predetermined distance with respect to the end part position such that the target object reaches to the adjusting position.

* * * * *